US009820247B2

(12) United States Patent
Xiong et al.

(10) Patent No.: US 9,820,247 B2
(45) Date of Patent: Nov. 14, 2017

(54) ENHANCED NODE B (ENB) AND METHOD FOR MTC COEXISTENCE

(71) Applicant: Intel IP Corporation, Santa Clara, CA (US)

(72) Inventors: Gang Xiong, Beaverton, OR (US); Debdeep Chatterjee, Santa Clara, CA (US); Seunghee Han, Cupertino, CA (US); Jong-Kae Fwu, Sunnyvale, CA (US)

(73) Assignee: Intel IP Corporation, Santa Clara, CA (US)

( * ) Notice: Subject to any disclaimer, the term of this patent is extended or adjusted under 35 U.S.C. 154(b) by 164 days.

(21) Appl. No.: 14/667,430

(22) Filed: Mar. 24, 2015

(65) Prior Publication Data

US 2016/0037514 A1   Feb. 4, 2016

Related U.S. Application Data

(60) Provisional application No. 62/031,054, filed on Jul. 30, 2014.

(51) Int. Cl.
*H04W 56/00* (2009.01)
*H04W 4/00* (2009.01)
(Continued)

(52) U.S. Cl.
CPC ....... *H04W 56/0015* (2013.01); *H04W 4/005* (2013.01); *H04W 48/12* (2013.01); *H04W 72/0453* (2013.01)

(58) Field of Classification Search
CPC .............. H04L 1/0693; H04B 7/0626; H04W 72/0406; H04W 72/0413; H04W 72/0446;
(Continued)

(56) References Cited

U.S. PATENT DOCUMENTS

2013/0100900 A1* 4/2013 Lee ............... H04W 72/048
370/329
2013/0136098 A1* 5/2013 Li ................. H04W 72/042
370/330
(Continued)

FOREIGN PATENT DOCUMENTS

WO   WO-2016018526 A1   2/2016

OTHER PUBLICATIONS

International Serach Report for PCT/US2015/036706, WO2016018526; dated Feb. 4, 2016.*
(Continued)

*Primary Examiner* — Benjamin H Elliott, IV
(74) *Attorney, Agent, or Firm* — Schwegman Lundberg & Woesnner, P.A.

(57) ABSTRACT

Embodiments of a machine-type communication (MTC) User Equipment (UE) and methods for configuring a MTC UE using an evolved Node B (eNB) are generally described herein. A method for configuring a UE for communication performed by circuitry of an evolved Node B (eNB) may include broadcasting, from the eNB, a physical downlink control channel (PDCCH) transmission on a licensed band, transmitting, from the eNB to the UE, a physical broadcast channel (PBCH) transmission multiplexed with a machine-type communication (MTC) PBCH (M-PBCH) transmission, the M-PBCH transmission including a MTC master information block (M-MIB) in a MTC region of the licensed band, wherein the MTC region includes a subset of frequencies of the licensed band, and transmitting, from the eNB to the UE, a first data transmission on the MTC region in a downlink.

23 Claims, 7 Drawing Sheets

(51) Int. Cl.
*H04W 72/04* (2009.01)
*H04W 48/12* (2009.01)

(58) Field of Classification Search
CPC .......... H04W 72/0453; H04W 74/002; H04W 74/0833; H04W 72/042
See application file for complete search history.

(56) References Cited

U.S. PATENT DOCUMENTS

| | | | |
|---|---|---|---|
| 2014/0286281 A1* | 9/2014 | Jang ...................... | H04L 5/0092 370/329 |
| 2015/0257173 A1* | 9/2015 | You ....................... | H04L 1/1864 370/330 |
| 2016/0007334 A1* | 1/2016 | Kim .................. | H04W 72/0453 370/329 |
| 2016/0037514 A1* | 2/2016 | Xiong ............... | H04W 56/0015 370/336 |

OTHER PUBLICATIONS

"3GPP; TSG RAN; Study on provision of low-cost MTC UEs based on LTE; (Rel ease 12)", 3GPP TR 36.888 V2.1.1, (Jun. 20, 2013), 18-42.
"Discussion on the resource allocation for low cost MTC 4,18 UEs", R1-141119, 3GPP TSG RAN WG1 Meeting #76bis, (Mar. 22, 2014), 1-3.
"International Application Serial No. PCT/US2015/036706, Written Opinion dated Nov. 4, 2015", 7 pgs.
"Remaining issues for low cost MTC UE", Intel Corporation, R1-142024, 3GPP TSG RAN WG1 #77, (May 10, 2014), 1-3.
"SIB Coverage Improvement for MTC UEs", ZTE, R1-140281. 3GPP TSG RAN WG1 Meeting #76, (Feb. 1, 2014), 1-5.
Ericsson, et al., "On Reduced UE Bandwidth and Enhanced Coverage for MTC", R1-142541, 3GPP TSG RAN \VG1 Meeting #77, (May 9, 2014), 1-2.

\* cited by examiner

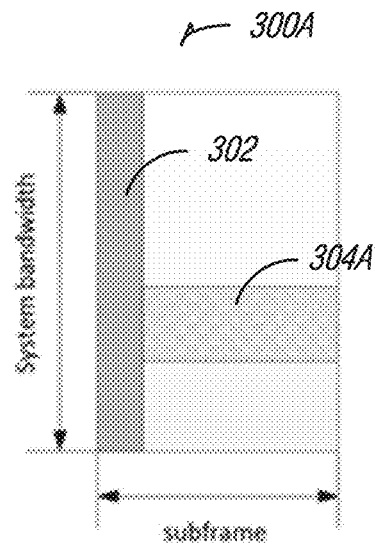
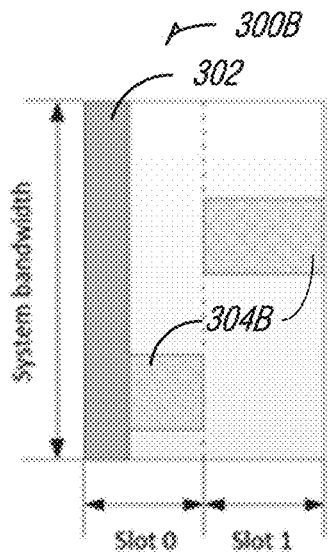
FIG. 3A    FIG. 3B
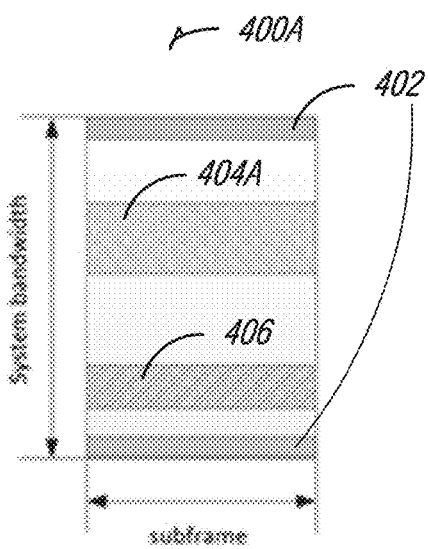
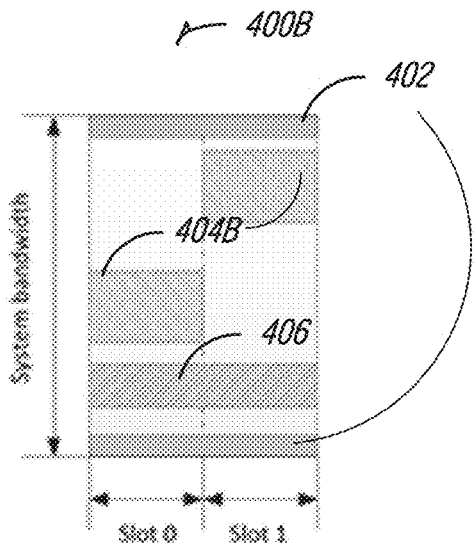
FIG. 4A    FIG. 4B

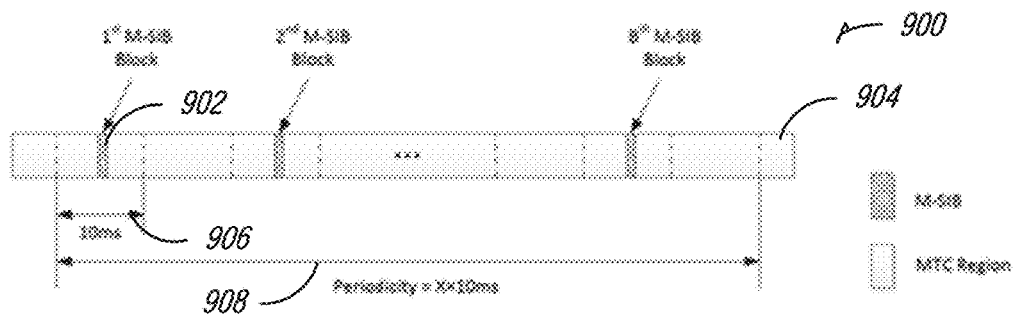
FIG. 9
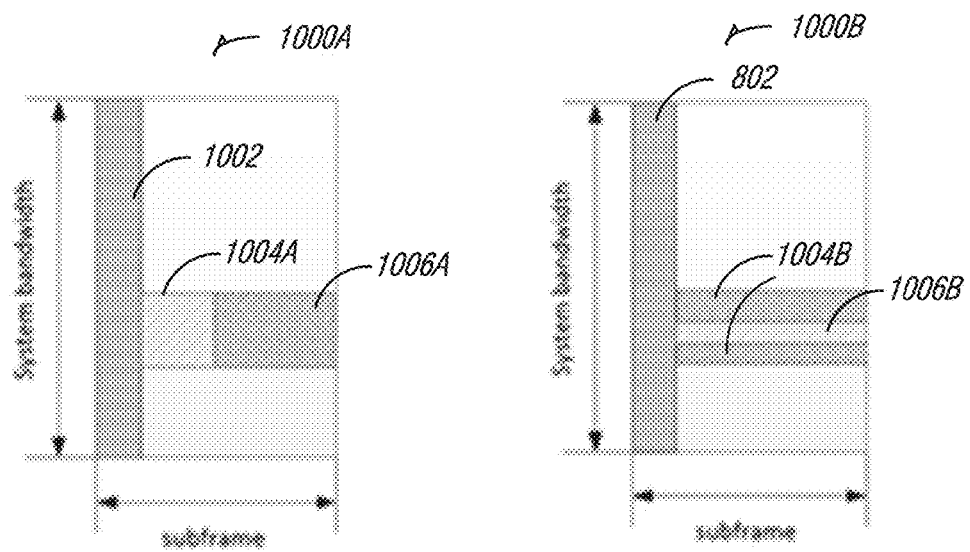
FIG. 10A   FIG. 10B

ENHANCED NODE B (ENB) AND METHOD FOR MTC COEXISTENCE

CLAIM OF PRIORITY

This patent application claims the benefit of priority of U.S. Provisional Patent Application Ser. No. 62/031,054, entitled "RAN1: System and Method on Coexistence of MTC and LTE System," filed on Jul. 30, 2014, which is hereby incorporated by reference herein in its entirety.

TECHNICAL FIELD

Embodiments pertain to wireless communications. Some embodiments relate to cellular communication networks including 3GPP (Third Generation Partnership Project) networks, 3GPP LTE (Long Term Evolution) networks, and 3GPP LTE-A (LTE-Advanced), although the scope of the embodiments is not limited in this respect. Some embodiments relate to Machine-Type Communication (MTC).

BACKGROUND

Machine-Type Communication (MTC) is a promising and emerging technology to enable a ubiquitous computing environment including the concept of an "Internet of Things (IoT)". Potential MTC-based applications include smart metering, healthcare monitoring, remote security surveillance, intelligent transportation system, etc. Currently, MTC devices are not designed to be integrated into current and next generation mobile broadband networks such as LTE and LTE-Advanced.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 3A and 3B illustrate generally diagrams of frequency-division and time-division locations for a machine-type communication (MTC) region in a downlink in accordance with some embodiments.

FIGS. 4A and 4B illustrate generally diagrams of frequency-division and time-division locations for the MTC region in an uplink in accordance with some embodiments.

FIG. 9 illustrates generally a diagram of a MTC system information bloc (M-SIB) transmission in accordance with some embodiments.

FIGS. 10A and 10B illustrate generally diagrams of the MTC region in a downlink in accordance with some embodiments.

DETAILED DESCRIPTION

Wireless communications today include a myriad of devices, controllers, methods, and systems. For example, wireless communications on licensed bands may involve a User Equipment (UE) and an evolved Node B (eNB) in different settings and varieties. In an example, a licensed band wireless communication system may include a Wireless Network operating as a 3rd Generation partnership Project (3GPP) long term evolution (LTE) or LTE-advanced network or other cellular phone network. In an LTE or LTE-advanced network, the minimum bandwidth is 1.4 MHz. In an example, Machine-Type Communication (MTC) may have a transmission bandwidth of 1.4 MHz. In other examples, MTC may have a transmission bandwidth of 200 kHz, 300 kHz, 400 kHz, or other values below or above 1.4 MHz. In an example, 200 kHz is approximately the size of a single physical resource block (PRB) in an LTE or LTE-advanced network. MTC may include device-to-device (also known as machine-to-machine) communication, Internet of Things type communication, or the like.

In an example, a control channel is transmitted across all of a system bandwidth. When the system bandwidth if larger than 1.4 MHz, a collision on the control channel may occur between an LTE or LTE-advanced system transmission and a MTC transmission. In another example, the existing mobile broadband networks may not be designed or optimized to meet the MTC related requirements.

In an example, a UE, an eNB, or a network, may be configured to support MTC. For example, a MTC region for communication may be established. The MTC region may include establishing or modifying time and frequency resource information, signaling, or collision handling. MTC support may include MTC channel state information (M-CRS) design, MTC physical broadcast channel M-PBCH design, MTC system information block M-SIB design, MTC control channel design including MTC physical downlink control channel (M-PDCCH) design, MTC physical control format indicator channel (M-PCFICH) design, or MTC physical hybrid-automatic repeat request (ARQ) indicator channel (M-PHICH) design, or MTC uplink design.

Figure 1:
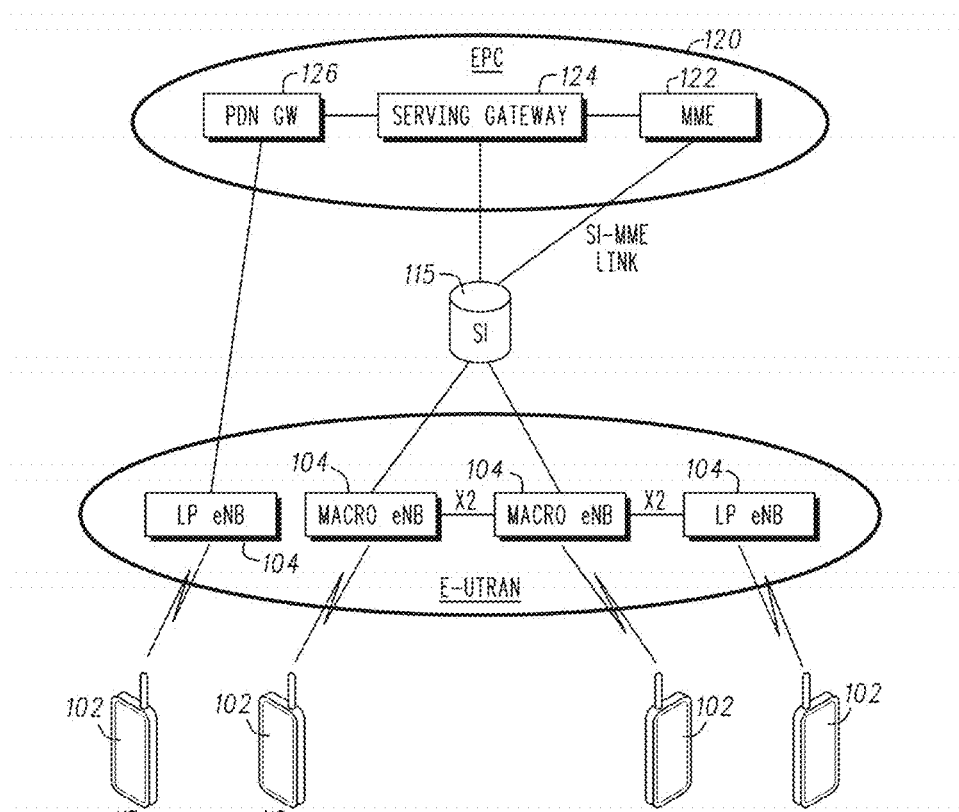
FIG. 1 illustrates generally a portion of an end-to-end network architecture of an LTE network with various components of the network in accordance with some embodiments.

FIG. 1 illustrates generally a portion of an end-to-end network architecture of an LTE network with various components of the network in accordance with some embodiments. The network 100 comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For sake of convenience and brevity, only a portion of the core network 120, as well as the RAN 100, is shown.

The core network 120 includes mobility management entity (MME) 122, serving gateway (serving GW) 124, and packet data network gateway (PDN GW) 126. The RAN includes enhanced node B's (eNBs) 104 (which may operate as base stations) for communicating with user equipment (UE) 102. The eNBs 104 may include macro eNBs and low power (LP) eNBs.

The MME is similar in function to the control plane of legacy Serving GPRS Support Nodes (SGSN). The MME manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 may be configured to communicate OFDM communication signals with an eNB 104 over a multicarrier communication channel in accordance with an OFDMA communication technique. The OFDM signals may comprise a plurality of orthogonal subcarriers.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller, and generally connects to the user's broadband line. Once plugged in, the femtocell connects to the mobile operator's mobile network and provides extra coverage in a range of typically 30 to 50 meters for residential femtocells.

Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB to a UE. The grid may be a time-frequency grid, called a resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements and in the frequency domain, this represents the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE about the transport format, resource allocation, and H-ARQ information related to the uplink shared channel. Typically, downlink scheduling (assigning control and shared channel resource blocks to UEs within a cell) is performed at the eNB based on channel quality information fed back from the UEs to the eNB, and then the downlink resource assignment information is sent to a UE on the control channel (PDCCH) used for (assigned to) the UE.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, $L_{,}=1$, 2, 4, or 8).

Figure 2:
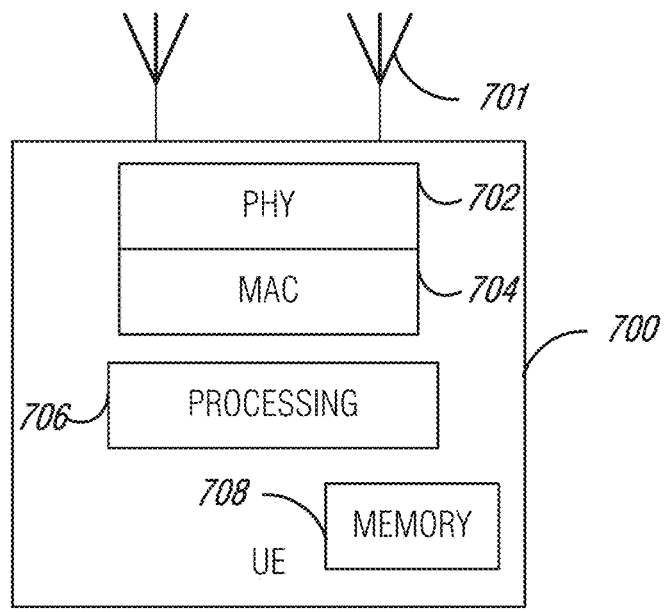
FIG. 2 illustrates generally a functional block diagram of a UE in accordance with some embodiments.

FIG. 2 illustrates a functional block diagram of a UE in accordance with some embodiments. The UE 200 may be suitable for use as any one or more of the UEs 102 illustrated in FIG. 1. The UE 200 may include physical layer circuitry 202 for transmitting and receiving signals to and from eNBs 104 (FIG. 1) using one or more antennas 201. UE 200 may also include medium access control layer (MAC) circuitry 204 for controlling access to the wireless medium. UE 200 may also include processing circuitry 206 and memory 208 arranged to configure the various elements of the UE to perform the operations described herein.

FIG. 2 illustrates generally a functional block diagram of a UE in accordance with some embodiments. UE 200 may be suitable for use as UE 102 (FIG. 1). The UE 200 may include physical layer circuitry 202 for transmitting and receiving signals to and from eNBs 104 (FIG. 1) using one or more antennas 201. UE 200 may also include medium access control layer (MAC) circuitry 204 for controlling access to the wireless medium. UE 200 may also include processing circuitry 206 and memory 208 arranged to perform the operations described herein.

In accordance with some embodiments, the MAC circuitry 204 may be arranged to contend for a wireless medium configure frames or packets for communicating over the wireless medium and the PHY circuitry 202 may be arranged to transmit and receive signals. The PHY 202 may include circuitry for modulation/demodulation, upconversion/downconversion, filtering, amplification, etc. In some embodiments, the processing circuitry 206 of the device 200 may include one or more processors. In some embodiments, two or more antennas may be coupled to the physical layer circuitry arranged for sending and receiving signals. The physical layer circuitry may include one or more radios for communication in accordance with cellular (e.g., LTE) and WLAN (e.g., IEEE 802.11) techniques. The memory 208 may be store information for configuring the processing circuitry 206 to perform operations for configuring and transmitting HEW frames and performing the various operations described herein.

In some embodiments, the UE 200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device, a medical device (e.g., a heart rate monitor, a blood pressure monitor, etc.), or other device that may receive and/or transmit information wirelessly. In some embodiments, the UE 200 may include one or more of a keyboard, a display, a non-volatile memory port, multiple antennas, a graphics processor, an application processor, speakers, and other mobile device elements. The display may be an LCD screen including a touch screen.

The one or more antennas 201 utilized by the UE 200 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between each of antennas and the antennas of a transmitting station. In some MIMO embodiments, the antennas may be separated by up to 1/10 of a wavelength or more.

Although the UE 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

In some embodiments, the UE 200 may be configured to receive OFDM communication signals over a multicarrier communication channel in accordance with an OFDMA communication technique. The OFDM signals may comprise a plurality of orthogonal subcarriers. In some broadband multicarrier embodiments, eNBs may be part of a broadband wireless access (BWA) network communication network, such as a Worldwide Interoperability for Microwave Access (WiMAX) communication network or a 3rd Generation Partnership Project (3GPP) Universal Terrestrial Radio Access Network (UTRAN) Long-Term-Evolution (LTE) or a Long-Term-Evolution (LTE) communication network, although the scope of the invention is not limited in this respect. In these broadband multicarrier embodiments, the UE 200 and the eNBs may be configured to communicate in accordance with an orthogonal frequency division multiple access (OFDMA) technique.

FIGS. 3A and 3B illustrate generally diagrams (e.g., 300A and 300B) of frequency-division and time-division locations for a machine-type communication (MTC) region (e.g., 304A and 304B) in a downlink in accordance with some embodiments. Diagrams 300A and 300B include a control region 302 for a LTE or LTE-advanced network. In an example, diagram 300A includes a MTC region 304A that is time-division multiplexed with the control region 302. As shown in diagram 300A, the control region 302 occurs before the MTC region 304A along the subframe axis. In an example, diagram 300A includes a frequency-division for the MTC region. In an example, the MTC region 304A may be located in a contiguous set of PRBs (e.g., six or seven PRBs) within the system bandwidth. For example, the MTC region may be located in a set of centered PRBs (e.g., six or seven PRBs), at the edge of the system bandwidth, etc. In another example, the MTC region may include a set of frequency locations and be described using subcarrier indexes in the system bandwidth in a downlink or an uplink. The uplink frequency locations for the MTC region may exclude a physical uplink control channel (PUCCH) region or a physical random access channel (PRACH) region. For example, the PUCCH or PRACH regions may be used for LTE or LTE-advanced communication and may not be necessary for MTC or may interfere with MTC and may not be used for MTC.

In another example, diagram 300B includes a MTC region 304B that has intra-slot hopping applied to further exploit frequency diversity. In diagram 300B, the control region 302 and the MTC region 304B may be time-division multiplexed and the MTC region 304B may further include the intra-slot hopping (e.g., a first set of frequencies or frequency band for slot 0 and a second set of frequencies or frequency band for slot 1). In another example, the MTC region may use intra-subframe hopping.

The time-division for FIGS. 3A and 3B may include orthogonal frequency-division multiplexing (OFDM) symbols of the MTC region in the downlink. Diagrams 300A and 300B may include a set of subframes within a frame in a downlink or an uplink for the MTC region. In an example, a starting symbol of the MTC region in the downlink may be predefined. In another example, the starting symbol may be configured to be after the PDCCH region for a subframe (or for all subframes) within a frame. For example, the PDCCH region may include the control region 302 and the MTC region may start after the control region 302 ends. In another example, subframes not allocated for PBCH and primary and secondary synchronization signal (PSS/SSS) transmission may be used for the MTC region in both downlink and uplink if a centered set of PRBs (e.g., six or seven PRBs) are allocated for MTC. For example, the MTC region may include a subframe not used for PSS/SSS.

FIGS. 4A and 4B illustrate generally diagrams (e.g., 400A and 400B) of frequency-division and time-division locations for a MTC region (e.g., 404A and 404B) in an uplink in accordance with some embodiments. In FIG. 4A, diagram 400A illustrates a MTC region 404A that is located in a contiguous frequency range, such as a set of PRBs (e.g., six or seven PRBs) in a system bandwidth. The MTC region 404A may exclude a PUCCH region 402 or a PRACH region 406. In diagram 400A, the example MTC region 404A is shown for a subframe without intra-slot hopping. In diagram 400B in FIG. 4B, the MTC region 404B includes intra-slot hopping to further exploit frequency diversity. The MTC region may also apply intra-subframe hopping. In an example, a PUCCH-type hopping may be used for intra-slot hopping to achieve maximal frequency diversity.

In another example, a time or frequency location for the MTC region may be different for either the uplink, the downlink, or both. A fixed hopping pattern may be used. The fixed hopping pattern may be derived from a physical cell identity. In another example, a subframe index may be defined. In the examples described above, randomizing inter-cell interference may be achieved.

In an example, a transmission using LTE or LTE-advanced type communication may be scheduled in the MTC region. In this example, an eNB may decide resource allocation for UEs that use the LTE or LTE-advanced type communication and UEs that use MTC.

In an example, the configuration for a MTC region may be predefined. In another example, the configuration for a MTC region may be configured by a higher layer. The configuration information may be predetermined. For example, a centered set of PRBs (e.g., six or seven PRBs) may be allocated for MTC region for downlink or uplink. In an example in the downlink, the MTC region starts from a 4th symbol within subframes other than subframe #0 and #5. In another example, time and frequency resource information for the MTC region may be indicated in a Master Information Block (MIB). In particular, a field that contains the configuration for the MTC region may occupy Y0 bits in a 10 spare bits in a legacy MIB. This may aid in backward compatibility.

In an example, M-PBCH may be allocated in the same resource (e.g., the same subframe, OFDM symbol, or PRBs) as a legacy PBCH. In addition, the existing channel coding, rate-matching, modulation, layer mapping, or precoding for a legacy PBCH transmission may be reused for the transmission of the M-PBCH.

Figure 5:
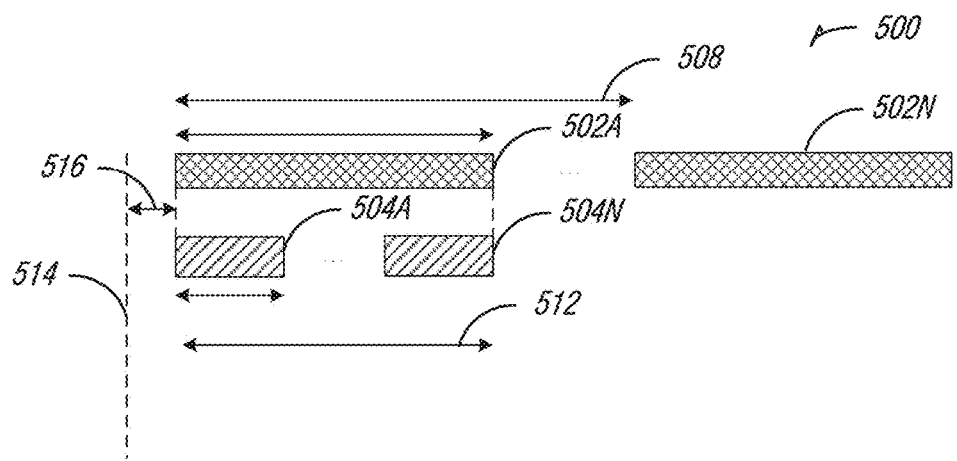
FIG. 5 illustrates generally signaling in the MTC region in the time-division in accordance with some embodiments.

FIG. 5 illustrates generally signaling in the MTC region 500 in the time-domain in accordance with some embodiments. Signaling in the MTC region may effectively accommodate various cases for eNB coordination and reduce signaling overhead due to the limited number of configurations. A UE for MTC may receive the downlink signal or data or transmit the uplink signal or data within a MTC occasion (e.g., 502A or 502N). In an example, in a subframe (e.g., 504A or 504N) there may be no data and the subframe (e.g., 504A or 504N) may be empty. The MTC occasion (e.g., 502A or 502N) may play a role to define the potential region for downlink or uplink scheduling.

The time or frequency resource information for the MTC region 500 may be conveyed via the PBCH or the M-PBCH and may comprise frequency location (e.g. in RB index region) or time location (e.g. OFDM symbol index, slot index, subframe index, or radio frame index). In a specific example to signal time related information, the configuration may contain a periodicity or subframe offset for the MTC region 500. The subframes (e.g., 504A and 504N) for a MTC purpose may be repeated (e.g., in consecutive subframes or in non-consecutive subframes for frequency-division duplexing (FDD), time-division duplexing (TDD), or half-duplex FDD (HD-FDD)). In another example, the subframes may be defined in consecutive available downlink subframes for TDD or HD-FDD within each MTC occasion (e.g., 502A or 502N).

A MTC occasion (e.g., 502A or 502N), for the first subframe of the downlink subframes 512, may satisfy:

$$(10 \times n_f + \lfloor n_s/2 \rfloor - \Delta_{MTC}) \bmod T_{MTC} = 0$$

where $n_f$ is a radio frame number and $n_s$ is a slot number. In an example, a MTC subframe offset 516 from subframe 0 in a radio frame 514, may be predetermined (e.g., $\Delta_{MTC}=0$) to reduce the signaling overhead. In this example, the signaling may be defined as:

TABLE 1

| MTC configuration Index $I_{MTC}$ | MTC periodicity $T_{MTC}$ (subframes) |
|---|---|
| 0 | 160 |
| 1 | 320 |
| 2 | 640 |
| 3 | 1280 |

In the example above, the MTC periodicity 508 may be selected as multiple of 40 ms (e.g., the period to convey the same MIB contents for legacy PBCH). The above example may assume a fixed (e.g., predetermined) $N_{MTC}$. In an example, $N_{MTC}$ may equal 5 (e.g., similar to SS periodicity). In another example, $N_{MTC}$ may equal 4 to avoid subframe 0 in a radio frame 514 or subframe 5 (e.g., the subframes used for SS/PBCH/SIB1/Paging). In yet another example, $N_{MTC}$ may equal 10 (e.g., radio frame length). In still another example, $N_{MTC}$ may equal 40 (e.g., in accordance with a period to convey the same MIB contents for legacy PBCH). Other values for $N_{MTC}$ may be used as well.

MTC subframe offset 516 may be also signaled with a limited candidate. For example, $\Delta_{MTC}$ may be 0 or 5.

TABLE 2

| MTC configuration Index $I_{MTC}$ | MTC periodicity $T_{MTC}$ (subframes) | MTC subframe offset $\Delta_{MTC}$ (subframes) |
|---|---|---|
| 0-1 | 160 | $5 \cdot I_{MTC}$ |
| 2-3 | 320 | $5 \cdot (I_{MTC} - 2)$ |
| 4-5 | 640 | $5 \cdot (I_{MTC} - 4)$ |
| 6-7 | 1280 | $5 \cdot (I_{MTC} - 6)$ |

In an example, $N_{MTC}$ may be signaled (if $\Delta_{MTC}$=0), for example, $N_{MTC}$ may be 5 or 10.

TABLE 3

| MTC configuration Index $I_{MTC}$ | MTC periodicity $T_{MTC}$ (subframes) | $N_{MTC}$ (subframes) |
|---|---|---|
| 0-1 | 160 | $5 \cdot (I_{MTC} + 1)$ |
| 2-3 | 320 | $5 \cdot (I_{MTC} - 1)$ |
| 4-5 | 640 | $5 \cdot (I_{MTC} - 3)$ |
| 6-7 | 1280 | $5 \cdot (I_{MTC} - 5)$ |

In an example, a bitmap may be defined for a subframe index allocated for the MTC region 500. In particular, the bitmap may be defined within the MTC occasion (e.g., 502A or 502N). For example, for $N_{MTC}$=4, a bitmap "0011" may be used to indicate that subframes #3 and #4 are allocated for the MTC region 500. In another example, a limited set of bitmaps together with an MTC occasion (e.g., 502A or 502N) and periodicity 508 may be configured to reduce the signalling overhead.

In another example, time and frequency resource information for the MTC region 500 may be broadcast in the MTC System Information Block (M-SIB). In this example, resource information (e.g., time and frequency location) or modulation and coding scheme (MCS) for M-SIB transmission may be predefined. In another example, the resource information or MCS of M-SIB transmission may be configured in a MTC Master Information Block (M-MIB). In the example using a M-MIB transmission, to configured the M-SIB, a field that contains information may occupy Y1 bits in the 10 spare bits in the legacy MIB to ensure backward compatibility. After successfully decoding the M-SIB, a MTC UE may determine the time and frequency information of MTC regions.

In another example, for different configurations of uplink and downlink MTC regions, separate or joint configuration signaling may be used. In the example with separate configuration signaling, a similar signaling mechanism as described above may be applied for both downlink and uplink MTC regions. In the example for joint configuration signaling, some of the configuration information, (e.g., MTC occasions) may be applied for both uplink and downlink MTC regions. For example, the MTC downlink or uplink subframes may be indicated by the MTC occasions as described above, with signaling of the differential bitmap corresponding to the configuration of the MTC uplink subframes that are different from the MTC downlink subframes. This example may include the option of configuring the exact same subframes for MTC downlink and uplink if the differential bitmap is empty.

In an example, transmissions may interfere or collide in the MTC region. When a downlink physical channel is transmitted within the MTC region, resource element (RE) mapping for the physical channel transmission may be rate-matched around the CRS or demodulation reference signal (DM-RS). The CRS or DM-RS may depend on a transmission mode. In another example, the MTC region may include a collision between a PSS/SSS transmission and a physical channel transmission. In this example, the RE mapping for the physical channel transmission may be rate-matched around the PSS/SSS transmission.

The MTC region may collide with a channel state information (CSI) reference signal (CSI-RS). In an example, resource element (RE) mapping for transmission of downlink physical channels in the MTC region may be rate-matched or punctured around the REs used in the CSI-RS configuration. In another example, the rate-matching or puncturing around REs used in the CSI-RS configuration may be performed with the mapping rule described above for the example of the MTC region colliding with a PSS/SSS transmission. In yet another example, an eNB may avoid the collision between a CSI-RS transmission and a transmission in the MTC region. The eNB may be configured to avoid the collisions and a UE may assume that CSI-RS is not transmitted within the MTC region.

In LTE or LTE-advanced, CRS may be generated based on a pseudo-random sequence. A pseudo-random sequence seed used to generate the pseudo-random sequence may be defined as a function of physical cell identity, indication of cyclic prefix, symbol index, or subframe index. In an example, an existing CRS may be reused in the MTC region. For example, frequency domain information (e.g., PRB index within the MTC region) may be known at a UE. Using the information and system bandwidth, a pseudo-random sequence may be determined and transmitted within the MTC region. The system bandwidth may be known by the UE from a MIB transmission.

In another example, if the frequency location for the MTC region within the LTE or LTE-advanced system is not known at the UE device, the UE device may not be able to determine the pseudo-random sequence and may not be able to perform a channel estimation. A new MTC CRS (M-CRS) may be defined and specified for UEs engaging in MTC. A subframe may be allocated for the MTC region. CRS (not M-CRS) may be transmitted only in a resource that is not assigned to the MTC region. For example, the MTC region may be allocated in a multimedia broadcast single frequency network (MBSFN) subframe, since CRS may not be transmitted in that subframe. In this example, the M-CRS pattern may reuse an existing CRS transmission or use a CRS pattern with a different MTC random seed.

The pseudo-random sequence seed may be defined as a function of an indication of the MTC region. For example:

$$c_{init} = f(I_{MTC})$$

where $I_{MTC}$ is the indication for MTC region and $I_{MTC}$=1 for the M-CRS transmission. A specific example, with c as a constant, may include:

$$c_{init} = 2^{10} \cdot (7 \cdot (n_s+1)+l+1) \cdot (2 \cdot N_{ID}^{cell}+1) + 2 \cdot N_{ID}^{cell} + c \cdot I_{MTC} + N_{CP}$$

In another example, a resource mapping pattern for CRS may be applied for the M-CRS transmission.

In an example, the M-MIB may be carried in a PBCH transmission or in a MTC PBCH (M-PBCH) transmission. Several options for including the M-MIB in the MTC PBCH transmission are described below relating to FIGS. 4-6.

Figure 6:
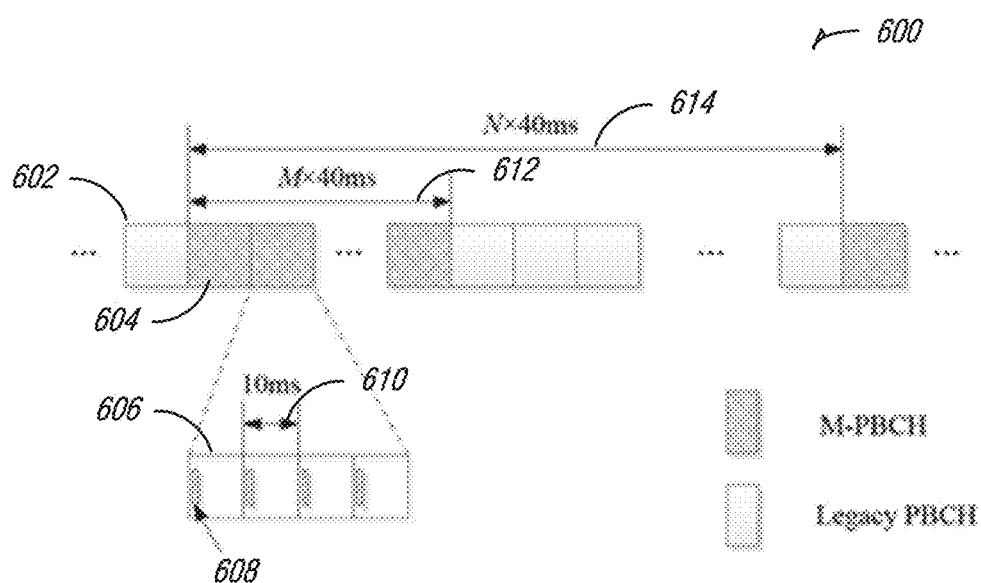
FIG. 6 illustrates generally a first diagram of a MTC physical broadcast channel (M-PBCH) transmission in accordance with some embodiments.

FIG. 6 illustrates generally a first diagram 600 of a MTC physical broadcast channel (M-PBCH) transmission 608 in accordance with some embodiments. Diagram 600 includes a legacy (e.g., LTE or LTE-advanced) PBCH transmission subframe 602 and a M-PBCH transmission subframe 604.

In FIG. 6, the M-PBCH transmission 608 may be transmitted intermittently. The M-PBCH transmission subframe 604 may be multiplexed with the legacy PBCH transmission subframe 602 in a time-division multiplexing manner. For example, the M-PBCH transmission subframe 604 may use a MTC system with narrowband deployment coexisting with a legacy system. In an example, the periodicity 614 of the M-PBCH transmission 608 may be N×40 ms. Within periodicity 614, the M-PBCH transmission 608 may be transmitted M times and have a duration 612 of M×40 ms. A slot 606 in the M-PBCH transmission subframe 604 or legacy PBCH transmission subframe 602 may have a duration 610 of 10 ms.

In an example, the M-PBCH transmission 608 may be transmitted in a legacy PBCH position. In another example, N may be larger than M, which may reduce the impact on the legacy LTE system. In other examples, various periodicity levels (N) and durations (M) for the M-PBCH transmission subframe 604 may be considered and configured by eNB. In an example, the eNB may adjust the values M and N dynamically depending on MTC traffic. The eNB may strike a balance between impacts on legacy UEs and access latency for MTC devices.

Figure 7:
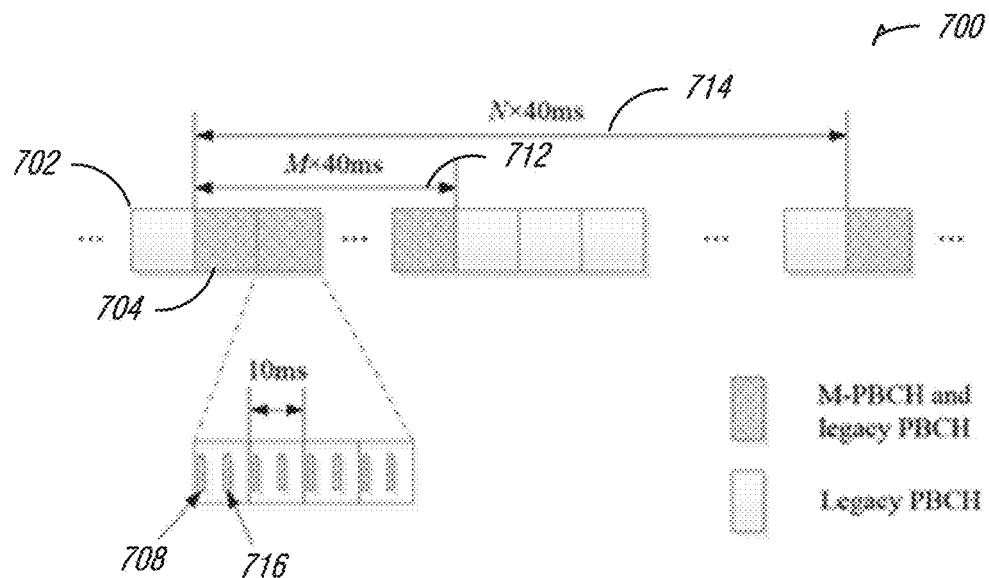
FIG. 7 illustrates generally a second diagram of a MTC physical broadcast channel (M-PBCH) transmission in accordance with some embodiments.

FIG. 7 illustrates generally a second diagram 700 of a MTC physical broadcast channel (M-PBCH) transmission 716 in accordance with some embodiments. In FIG. 7, the M-PBCH transmission 716 may be transmitted intermittently and allocated in locations other than the legacy PBCH transmission location 708. FIG. 7 illustrates the M-PBCH transmission 716 when a MTC system with narrowband deployment coexists with a LTE system. Similar to the periodicity 614 described above for FIG. 6, the periodicity 714 and duration 712 of a M-PBCH transmission subframe 704 may be N×40 ms and M×40 ms, respectively. In an example, a legacy PBCH transmission 608 may be transmitted during the M-PBCH transmission subframe 704 duration 712, minimizing the impact on the legacy system. In another example, the values M and N may be dynamically adjusted by the eNB, and may be dependent on the MTC traffic.

In an example, the M-PBCH transmission 716 may be transmitted in subframes other than subframe #0. For example, the M-PBCH transmission 716 may be transmitted in a subframe #5. To simply the specification effort and implementation cost, the M-PBCH transmission 716 may be allocated in the same resource (e.g., the same OFDM symbol or PRBs) as the legacy PBCH transmission 708. In another example, an existing channel coding, rate-matching, modulation, layer mapping, or precoding for the legacy PBCH transmission 708 may be reused for the M-PBCH transmission 716.

In another example, the M-PBCH transmission 716 may be transmitted in a subframe #0 like the legacy PBCH transmission 708, and it may be allocated in different OFDM symbols. In this example, existing channel coding, modulation and layer mapping, or precoding may be reused for the M-PBCH transmission 716. After a tail bit convolutional coding, a rate-matching operation may be performed to fill in available resource elements, excluding the control region, CRS, PSS/SSS or PBCH symbol (e.g., excluding resource elements defined separately for the MTC region). In yet another example, a frequency first mapping may be applied for the M-PBCH transmission 716 to align with the legacy PBCH transmission 708. In this example, a starting symbol for the M-PBCH transmission 716 may be predetermined. For example, the M-PBCH transmission 716 may be transmitted starting from an OFDM symbol #4.

Figure 8:
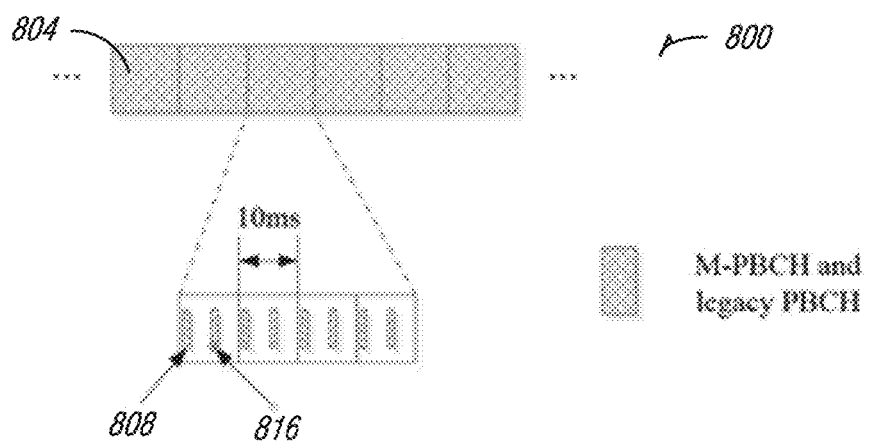
FIG. 8 illustrates generally a third diagram of a MTC physical broadcast channel (M-PBCH) transmission in accordance with some embodiments.

FIG. 8 illustrates generally a third diagram 800 of a MTC physical broadcast channel (M-PBCH) transmission 816 in accordance with some embodiments. In an example, the M-PBCH transmission 816 may be transmitted together with a legacy PBCH transmission 808 in all subframes, such as subframe 804. For example, the M-PBCH transmission 816 may be transmitted in a different locations than the legacy PBCH transmission 808. The M-PBCH transmission 816 with a MTC system with narrowband deployment may coexist with a legacy system. For example, the M-PBCH transmission 816 schemes described above for FIG. 7 may be applied for the configuration used in FIG. 8. The diagram 800 may reduce the access latency for the MTC devices at the cost of the overall system level spectrum efficiency.

In an example, for FIGS. 7 and 8, M-PBCH transmissions (e.g., 716 and 816) may be transmitted in different subframes than legacy PBCH transmissions (e.g., 708 and 808), and several options may be considered for resource allocation for remaining symbols. In an example, the remaining symbols within the PRBs may not be used. In another example, the remaining symbols within the PRBs may be used to transmit a legacy physical downlink shared channel (PDSCH) transmission. This example may include puncturing of the corresponding four symbols that carry the M-PBCH transmission if the legacy PDSCH is active. In yet another example, the remaining symbols within the PRBs may be used to transmit MTC-specific channels (e.g., M-PDSCH).

FIG. 9 illustrates generally a diagram 900 of a MTC system information bloc (M-SIB) transmission 902 in accordance with some embodiments. In legacy systems, such as LTE or LTE-advanced, a system information block (SIB) may be transmitted on the PDSCH. The PDSCH may be indicated by a corresponding PDCCH including a system-information radio network temporary identifier (SI-RNTI). The PDCCH may indicate a transport format or PRB resources used for the system-information transmission. In an example, a UE for MTC may have a narrowband constraint and scheduling a SIB in the MTC region similar to the legacy systems may be difficult, but also may be a viable option in circumstances desiring ease of use. A M-SIB may be used to convey information similar to that of a SIB without using the same formats and transport systems of the SIB. In another example, the M-SIB may incorporate information from an existing SIB as well as having additional MTC information. Information from an existing SIB may be used to ensure the UE has access to a network while using MTC.

In an example, a time domain configuration for the M-SIB transmission 902 may be predefined. In another example, the M-SIB transmission 902 may be configured by a higher layer. The time domain configuration information may include a subframe index and a periodicity 908 of the M-SIB transmission 902.

In the example above where the M-SIB transmission 902 is predefined, the M-SIB transmission 902 may be transmitted in a subframe #n in a frame 906 within the MTC region 904. The M-SIB transmission 902 may have a periodicity 908 of X×10 ms. In another example, multiple M-SIB blocks, (e.g, B>1) may be transmitted within the MTC region 904 with a periodicity 908 of X×10 ms. The M-SIB may use autonomous hybrid-automatic repeat request (ARQ) retransmissions of a first M-SIB transmission 902 may be applied to improve the decoding performance (e.g., similar to the existing SIB-1 transmission from legacy systems). In this case, a predefined redundancy version (RV) pattern among multiple M-SIB blocks within X×10 ms may be specified for the M-SIB transmission 902. For example, if B=4, the RV pattern for the M-SIB transmission 902 may be predefined as 0, 2, 3, 1. RV may include incremental redundancy gain for the M-SIB transmission 902. For example, in a first M-SIB transmission, RV may be set to 0, in a second M-SIB transmission, RV may be set to 2, etc.

In another example, the time domain configuration may be configured by higher layers and may be broadcast in the M-MIB. To aid in backward compatibility, a field containing the time domain configuration may occupy Y2 bits in a spare 10 bits in a legacy MIB.

In an example, the frequency domain information for the M-SIB transmission 902 may be predefined or indicated in the MTC PDCCH (M-PDCCH) or the EPDCCH with a common search space (CSS). For example, the frequency domain information for the M-SIB transmission 902 may be predefined with available resources in a subframe within the MTC region 904 (e.g., 6 or 7 PRBs for 1.4 MHz bandwidth) allocated for the M-SIB transmission 902. This may reduce signaling overhead substantially, especially when considering the narrowband deployment of MTC devices.

FIGS. 10A and 10B illustrate generally diagrams (e.g., 1000A and 1000B) of the MTC region in a downlink in accordance with some embodiments. Legacy PDCCH, PHICH, and PCFICH may be transmitted across an entire system bandwidth. For MTC devices with narrow bandwidth, it may be difficult to receive and decode the downlink control channels correctly since the MTC region is a subset of frequencies of the entire system bandwidth. To address this issue, a new MTC downlink control channel may be added. FIG. 10A illustrates a MTC downlink control channel design in the MTC region. In an example, the MTC downlink control channel or MTC control region 1004A may span the first K OFDM symbols in the MTC region while MTC data channels 1006A may occupy the remaining OFDM symbols in the MTC region. In other words, the MTC control region 1004A may be time-division multiplexed with the MTC data channels 1006A. The MTC control region 1004A and MTC data channels 1006A may be multiplexed in the time-division with a legacy control region 1002. In diagram 1000B, the MTC control region 1004B and the MTC data channels 1006B may be multiplexed in the frequency domain within the MTC region. The MTC control region 1004B and MTC data channels 1006B may also be multiplexed in the time-division with a legacy control region 1002.

In an example, a M-PCFICH may be considered in a control channel, similar to legacy LTE or LTE-advanced networks. In a simplifying example, existing PCFICH designs in LTE or LTE-advanced networks may be used for M-PCFICH design, (e.g., channel coding, modulation scheme, layer mapping and precoder, or resource mapping). In particular, 16 M-PCFICH symbols may be grouped into 4 symbol quadruplets and each symbol quadruplet may be allocated into one resource element group.

In another example, a number of OFDM symbols allocated for M-PDCCH or a starting symbol for a M-PDSCH transmission may be predefined. In yet another example, the number or starting symbol may be configured by higher layers. In the second example, the M-PCFICH may not be needed in the control channel design. In an example, transmitting a M-PCFICH transmission may include determining that a number of OFDM symbols allocated for MTC physical downlink control channel (M-PDCCH) and a starting symbol for a MTC physical downlink shared channel (M-PDSCH) transmission are not pre-defined.

In an example, a M-PHICH may be supported to carry the hybrid-ARQ acknowledgement/non-acknowledgement (ACK/NACK), that may indicate whether the eNB has correctly received a transmission on the PUSCH. The M-PHICH configuration may include a duration of a M-PHICH transmission. In another example, a number of M-PHICH groups may be predefined. In yet another example, a number of M-PHICH groups may be configured by higher layers. For example, the configuration information may be broadcast in the M-SIB. The M-PHICH configuration may follow the configuration for the existing PHICH in the legacy LTE or LTE-advanced networks. In the example using the legacy networks, a 3 bit PHICH configuration in the MIB may be reused for M-PHICH to save overhead. In another example, M-PHICH configuration may be indicated in a spare 10 bits in the MIB and separate configuration for PHICH in the legacy LTE or LTE-advanced system and M-PHICH in the MTC system may be signaled.

In another example, an existing PHICH design in a legacy LTE or LTE-advanced specification may be reused for a M-PHICH design (e.g., channel coding, modulation scheme, layer mapping and precoder, or resource mapping). In this example, 12 symbols for one M-PHICH group may be grouped into 3 symbol quadruplets and each symbol quadruplet may be allocated into one resource element group. In another example, the M-PHICH may be excluded (e.g., not needed) in the MTC control channel design. The M-PHICH may be excluded if the M-PHICH functionality may be replaced by M-PDCCH.

In an example, of the MTC control region design, an existing PDCCH design may be reused for a M-PDCCH design. The M-PDCCH design may include a legacy downlink control information (DCI) format, channel coding, modulation, layer mapping and precoding, resource mapping, or the like. In another example, an existing hashing table for common search space (CSS) and UE specific search space (USS) may be reused for M-PDCCH design. In yet another example, of the MTC control region design, an existing EPDCCH may be reused for the M-PDCCH design.

In an example of the MTC control region design, a MTC resource element group (M-REG) may be defined similar to the existing REG in the current LTE or LTE-advanced specification. The MTC control region may be collided with a PSS/SSS or a CSI-RS transmission. In the design of M-REG, an updated resource mapping rule may be considered to handle the collision. For example, if the MTC control region collides with PSS/SSS, the M-REG may be defined for the resource elements which are not allocated for PSS/SSS transmission. If the MTC control region is collided with a CSI-RS transmission, the M-REG may not be defined for the resource elements used for CSI-RS configurations.

Figure 11:
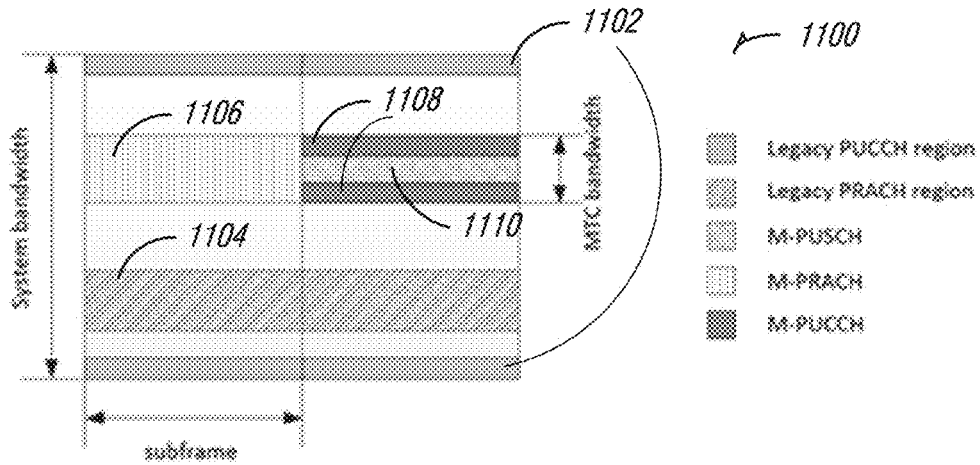
FIG. 11 illustrates generally a diagram of the MTC region in an uplink in accordance with some embodiments.

FIG. 11 illustrates generally a diagram 1100 of the MTC region in an uplink in accordance with some embodiments. In an example, MTC PRACH (M-PRACH) 1106, MTC PUSCH (M-PUSCH) 1110, or MTC PUCCH (M-PUCCH) 1108 resource allocation may follow an existing LTE or LTE-advanced type of design, for example, for a 1.4 MHz bandwidth. In an example, to minimize the specification impact and implementation cost, the physical layer processing for M-PRACH 1106, M-PUCCH 1108, or M-PUSCH 1110 may follow the existing design for a legacy PRACH 1104, legacy PUCCH 1102, or legacy PUSCH (not shown) from an LTE or LTE-advanced system.

Figure 12:
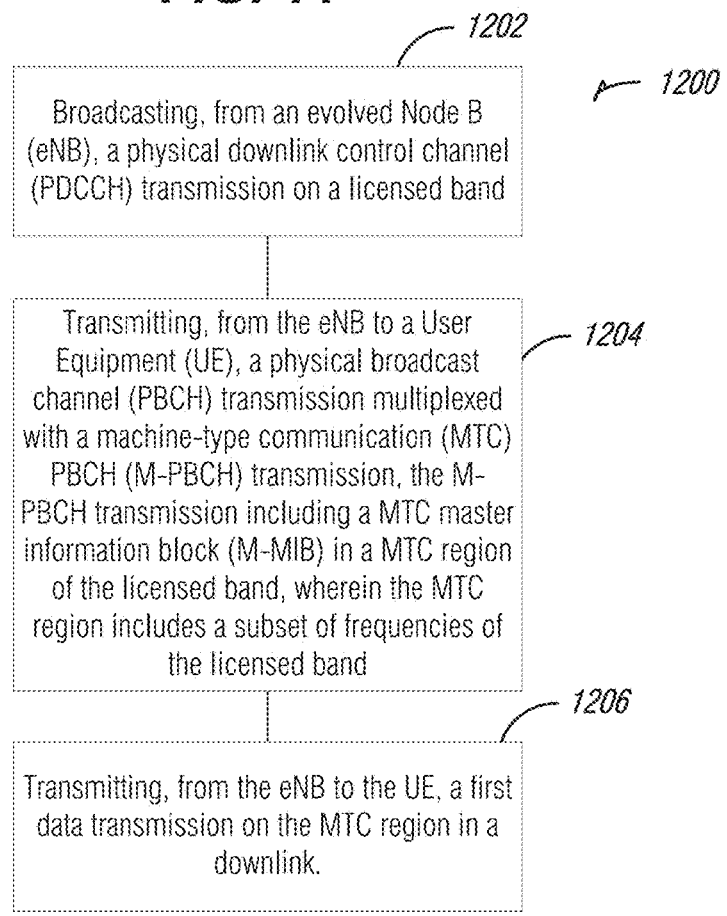
FIG. 12 illustrates generally a flowchart showing a method for using a MTC User Equipment (UE) on a licensed bandwidth in accordance with some embodiments.

FIG. 12 illustrates generally a flowchart showing a method 1200 for using a MTC User Equipment (UE) on a licensed bandwidth in accordance with some embodiments. In an example, the method 1200 may include a method 1200 for configuring a User Equipment (UE for communication performed by circuitry of an evolved Node B (eNB). The method 1200 may include an operation 1202 to broadcast, from the eNB, a physical downlink control channel (PDCCH) transmission on a licensed band. The method 1200 may include an operation 1204 to transmit, from the eNB to the UE, a physical broadcast channel (PBCH) transmission multiplexed with a machine-type communication (MTC) PBCH (M-PBCH) transmission, the M-PBCH transmission including a MTC master information block (M-MIB) in a MTC region of the licensed band, wherein the MTC region includes a subset of frequencies of the licensed band. The method 1200 may include an operation 1206 to transmit, from the eNB to the UE, a first data transmission on the MTC region in a downlink.

Figure 13:
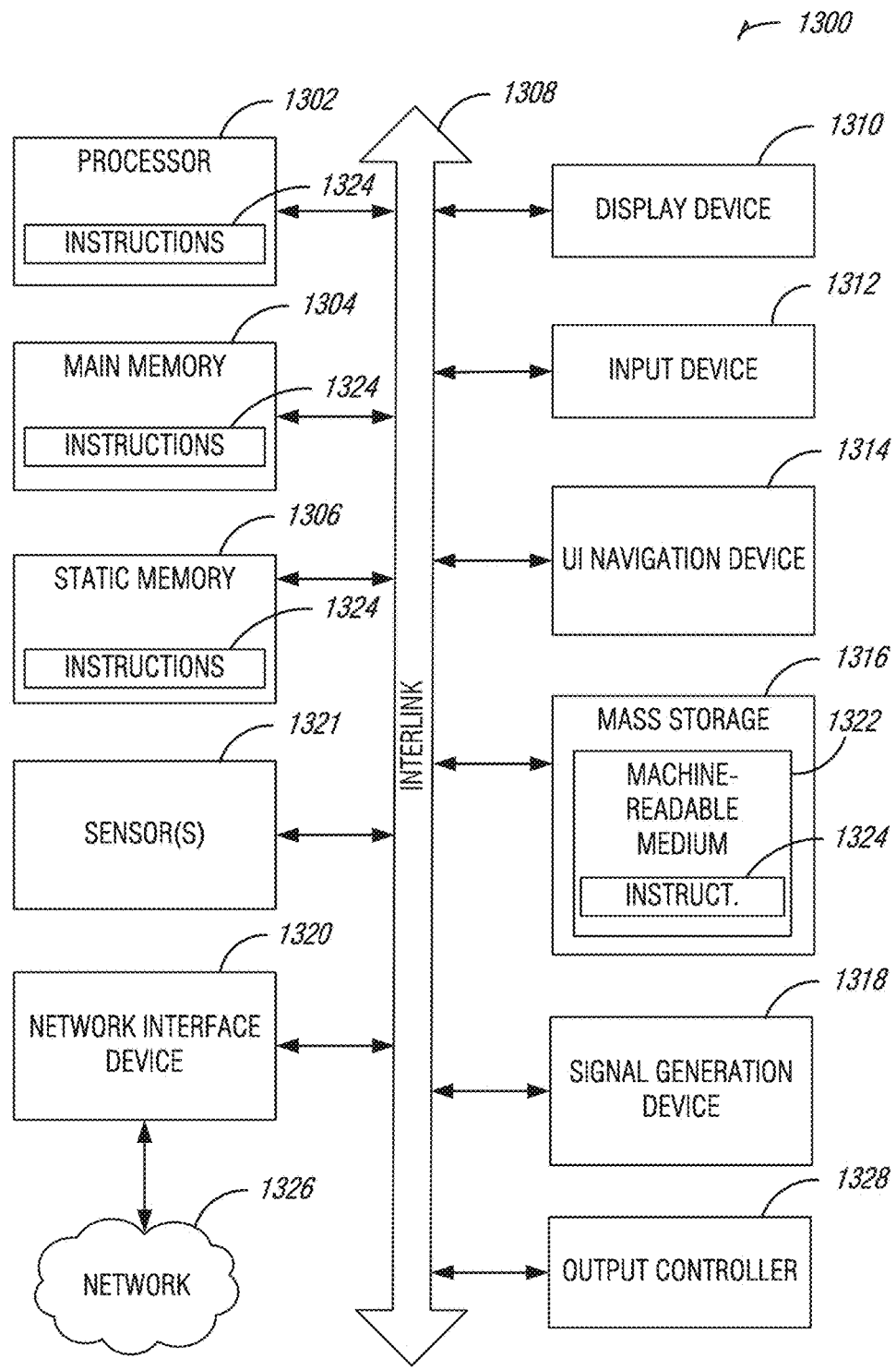
FIG. 13 illustrates generally an example of a block diagram of a machine upon which any one or more of the techniques (e.g., methodologies) discussed herein may perform in accordance with some embodiments.

FIG. 13 illustrates generally an example of a block diagram of a machine 1300 upon which any one or more of the techniques (e.g., methodologies) discussed herein may perform in accordance with some embodiments. In alternative embodiments, the machine 1300 may operate as a standalone device or may be connected (e.g., networked) to other machines. In a networked deployment, the machine 1300 may operate in the capacity of a server machine, a client machine, or both in server-client network environments. In an example, the machine 1300 may act as a peer machine in peer-to-peer (P2P) (or other distributed) network environment. The machine 1300 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 1300 may include a hardware processor 1302 (e.g., a central processing unit (CPU), a graphics processing unit (GPU), a hardware processor core, or any combination thereof), a main memory 1304 and a static memory 1306, some or all of which may communicate with each other via an interlink (e.g., bus) 1308. The machine 1300 may further include a display unit 1310, an alphanumeric input device 1312 (e.g., a keyboard), and a user interface (UI) navigation device 1314 (e.g., a mouse). In an example, the display unit 1310, alphanumeric input device 1312 and UI navigation device 1314 may be a touch screen display. The machine 1300 may additionally include a storage device (e.g., drive unit) 1316, a signal generation device 1318 (e.g., a speaker), a network interface device 1320, and one or more sensors 1321, such as a global positioning system (GPS) sensor, compass, accelerometer, or other sensor. The machine 1300 may include an output controller 1328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1316 may include a machine readable medium 1322 that is non-transitory on which is stored one or more sets of data structures or instructions 1324 (e.g., software) embodying or utilized by any one or more of the techniques or functions described herein. The instructions 1324 may also reside, completely or at least partially, within the main memory 1304, within static memory 1306, or within the hardware processor 1302 during execution thereof by the machine 1300. In an example, one or any combination of the hardware processor 1302, the main memory 1304, the static memory 1306, or the storage device 1316 may constitute machine readable media.

While the machine readable medium 1322 is illustrated as a single medium, the term "machine readable medium" may include a single medium or multiple media (e.g., a centralized or distributed database, and/or associated caches and servers) configured to store the one or more instructions 1324.

The term "machine readable medium" may include any medium that is capable of storing, encoding, or carrying instructions for execution by the machine 1300 and that cause the machine 1300 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1324 may further be transmitted or received over a communications network 1326 using a transmission medium via the network interface device 1320 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1320 may include one or more physical jacks (e.g., Ethernet, coaxial, or phone jacks) or one or more antennas to connect to the communications network 1326. In an example, the network interface device 1320 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1300, and includes digital or analog communications signals or other intangible medium to facilitate communication of such software.

Various Notes & Examples

Each of these non-limiting examples may stand on its own, or may be combined in various permutations or combinations with one or more of the other examples.

Example 1 includes the subject matter embodied by an evolved Node B (eNB) configured to communicate with a User Equipment (UE) on a licensed band, the eNB comprising circuitry configured to: transmit a physical downlink control channel (PDCCH) transmission on the licensed band, transmit, to the UE, a machine-type communication (MTC) system information block (M-SIB), the M-SIB including configuration information to configure a MTC region of the licensed band, wherein the MTC region includes a subset of frequencies of the licensed band, and transmit, to the UE, a first data transmission on the MTC region in a downlink, and receive, from the UE, a second data transmission on the MTC region in an uplink.

In Example 2, the subject matter of Example 1 can optionally include wherein to transmit the first data transmission, the circuitry is configured to transmit the first data transmission multiplexed with a third data transmission.

In Example 3, the subject matter of one or any combination of Examples 1-2 can optionally include wherein the first data transmission and the third data transmission are multiplexed in a time-division.

In Example 4, the subject matter of one or any combination of Examples 1-3 can optionally include wherein the first data transmission and the third data transmission are multiplexed in a frequency-division.

In Example 5, the subject matter of one or any combination of Examples 1-4 can optionally include wherein to receive the second data transmission, the circuitry is configured to receive the second data transmission multiplexed with a fourth data transmission.

In Example 6, the subject matter of one or any combination of Examples 1-5 can optionally include wherein to transmit the first transmission, the circuitry is configured to transmit the first data transmission using intra-slot hopping.

In Example 7, the subject matter of one or any combination of Examples 1-6 can optionally include wherein to receive the second data transmission, the circuitry is configured to receive the second data transmission multiplexed in a frequency-division with transmissions on a physical uplink control channel (PUCCH) or a physical random access channel (PRACH).

In Example 8, the subject matter of one or any combination of Examples 1-7 can optionally include wherein to receive the second data transmission, the circuitry is further configured to receive the second data transmission in an intra-slot hopping frequency transmission.

In Example 9, the subject matter of one or any combination of Examples 1-8 can optionally include wherein the intra-slot hopping frequency transmission includes a fixed hopping pattern.

In Example 10, the subject matter of one or any combination of Examples 1-9 can optionally include wherein the fixed hopping pattern includes information about a physical cell identity.

In Example 11, the subject matter of one or any combination of Examples 1-10 can optionally include wherein the fixed hopping pattern includes information about a subframe index.

In Example 12, the subject matter of one or any combination of Examples 1-11 can optionally include wherein the MTC region is predefined.

In Example 13, the subject matter of one or any combination of Examples 1-12 can optionally include wherein the M-SIB includes time and frequency resource information of the MTC region for the UE.

In Example 14, the subject matter of one or any combination of Examples 1-13 can optionally include wherein the circuitry is further configured to transmit, to the UE, separate signaling configurations for an uplink MTC region and a downlink MTC region.

In Example 15, the subject matter of one or any combination of Examples 1-14 can optionally include wherein the circuitry is further configured to transmit, to the UE, a joint signaling configuration for an uplink MTC region and a downlink MTC region.

In Example 16, the subject matter of one or any combination of Examples 1-15 can optionally include wherein the circuitry is further configured to transmit, to the UE, primary and secondary synchronization signals (PSS/SSS).

In Example 17, the subject matter of one or any combination of Examples 1-16 can optionally include wherein the circuitry is further configured to rate-match resource element mapping around the PSS/SSS within the MTC region.

In Example 18, the subject matter of one or any combination of Examples 1-17 can optionally include wherein the circuitry is further configured to transmit, to the UE, a channel state information reference signal (CSI-RS).

In Example 19, the subject matter of one or any combination of Examples 1-18 can optionally include wherein the circuitry is further configured to rate-match resource element mapping around the CSI-RS within the MTC region.

In Example 20, the subject matter of one or any combination of Examples 1-19 can optionally include wherein the circuitry is further configured to avoid collisions between the CSI-RS and transmissions in the MTC region.

In Example 21, the subject matter of one or any combination of Examples 1-20 can optionally include wherein the circuitry is further configured to transmit, to the UE, a cell-specific reference signal.

In Example 22, the subject matter of one or any combination of Examples 1-21 can optionally include wherein the cell-specific reference signal is transmitted in a multimedia broadcast single frequency network subframe in the MTC region.

In Example 23, the subject matter of one or any combination of Examples 1-22 can optionally include wherein the cell-specific reference signal includes a resource mapping pattern using a MTC random seed.

In Example 24, the subject matter of one or any combination of Examples 1-23 can optionally include wherein the circuitry is further configured to transmit, to the UE, a MTC master information block (M-MIB).

In Example 25, the subject matter of one or any combination of Examples 1-24 can optionally include wherein to transmit the M-MIB, the circuitry is further configured to transmit the M-MIB in a subframe in a frame within the MTC region.

In Example 26, the subject matter of one or any combination of Examples 1-25 can optionally include wherein the M-MIB includes time and frequency resource information for the UE.

In Example 27, the subject matter of one or any combination of Examples 1-26 can optionally include wherein to transmit the M-MIB, the circuitry is further configured to transmit the M-MIB using a MTC physical broadcast channel (M-PBCH).

In Example 28, the subject matter of one or any combination of Examples 1-27 can optionally include wherein the circuitry is further configured to transmit a MTC physical broadcast channel (M-PBCH) transmission in a subframe.

In Example 29, the subject matter of one or any combination of Examples 1-28 can optionally include wherein the subframe includes a subframe not used for primary and secondary synchronization signals (PSS/SSS).

In Example 30, the subject matter of one or any combination of Examples 1-29 can optionally include wherein the circuitry is further configured to transmit, to the UE, a second subframe, the second subframe including a physical broadcast channel (PBCH) transmission different from the M-PBCH transmission.

In Example 31, the subject matter of one or any combination of Examples 1-30 can optionally include wherein the PBCH transmission and the M-PBCH transmission are time-division multiplexed between the subframe and the second subframe, and wherein the PBCH transmission and the M-PBCH transmission are allocated in the same resource.

In Example 32, the subject matter of one or any combination of Examples 1-31 can optionally include wherein the circuitry is further configured to transmit a physical broadcast channel (PBCH) transmission different from the M-PBCH transmission in the subframe.

In Example 33, the subject matter of one or any combination of Examples 1-32 can optionally include wherein the PBCH transmission and the M-PBCH transmission are time-division multiplexed within the subframe.

In Example 34, the subject matter of one or any combination of Examples 1-33 can optionally include wherein the circuitry is further configured to transmit, to the UE, a MTC physical control format indicator channel (PCFICH) transmission.

In Example 35, the subject matter of one or any combination of Examples 1-34 can optionally include wherein to transmit the MTC PCFICH transmission, the circuitry is further configured to determine that a number of orthogonal frequency-division multiplexing (OFDM) symbols allocated for MTC physical downlink control channel (M-PDCCH) and a starting symbol for a MTC physical downlink shared channel (M-PDSCH) transmission are not pre-defined.

In Example 36, the subject matter of one or any combination of Examples 1-35 can optionally include wherein the circuitry is further configured to transmit, to the UE, a physical hybrid-automatic repeat request (ARQ) indicator channel M-PHICH transmission.

In Example 37, the subject matter of one or any combination of Examples 1-36 can optionally include wherein to transmit the M-PHICH, the circuitry is further configured to transmit, to the UE, configuration information in a system information block (SIB) or a master information block (MIB).

In Example 38, the subject matter of one or any combination of Examples 1-37 can optionally include wherein to transmit the M-PHICH, the circuitry is further configured to determine that a MTC physical downlink control channel (M-PDCCH) has not replaced the M-PHICH functionality.

In Example 39, the subject matter of one or any combination of Examples 1-38 can optionally include wherein the circuitry is further configured to transmit, to the UE, a MTC physical downlink control channel (M-PDCCH) transmission in the MTC region.

In Example 40, the subject matter of one or any combination of Examples 1-39 can optionally include wherein the M-PDCCH includes an existing enhanced physical downlink control channel (EPDCCH).

In Example 41, the subject matter of one or any combination of Examples 1-40 can optionally include wherein the circuitry is further configured to receive a MTC physical random access channel (M-PRACH) transmission from the UE.

In Example 42, the subject matter of one or any combination of Examples 1-41 can optionally include wherein the M-PRACH transmission is time-division multiplexed with a MTC physical uplink control channel (M-PUCCH) transmission and a MTC physical uplink shared channel (M-PUSCH) transmission in the MTC region.

In Example 43, the subject matter of one or any combination of Examples 1-42 can optionally include wherein the M-PUCCH transmission and the M-PUSCH transmission are frequency-division multiplexed in the MTC region.

Example 44 includes the subject matter embodied by an evolved Node B (eNB) configured to communicate with a User Equipment (UE) on a licensed band, the eNB comprising circuitry configured to: transmit a physical downlink control channel (PDCCH) transmission on the licensed band, transmit, to the UE, a machine-type communication (MTC) master information block (M-MIB), the M-MIB including configuration information to configure a MTC region of the licensed band, wherein the MTC region includes a subset of frequencies of the licensed band, and transmit, to the UE, a first data transmission on the MTC region in a downlink, and receive, from the UE, a second data transmission on the MTC region in an uplink.

In Example 45, the subject matter of Example 44 can optionally include wherein the circuitry is further configured to transmit, to the UE, a MTC system information block (M-SIB).

In Example 46, the subject matter of one or any combination of Examples 44-45 can optionally include wherein to transmit the M-SIB, the circuitry is further configured to transmit the M-SIB in a subframe in a frame within the MTC region.

In Example 47, the subject matter of one or any combination of Examples 44-46 can optionally include wherein the M-SIB includes time and frequency resource information for the UE.

Example 48 includes the subject matter embodied by a User Equipment (UE) configured to operate on a machine-type communication (MTC) MTC region of a wireless spectrum comprising: a transceiver configured to: receive, from an evolved Node B (eNB) a physical downlink control channel (PDCCH) transmission on a licensed band, receive, from the eNB, a MTC system information block (M-SIB), the M-SIB including configuration information to configure the MTC region, and receive a first data transmission on the MTC region in a downlink, wherein the MTC region includes a subset of frequencies of the licensed band, and transmit a second data transmission on the MTC region in an uplink.

In Example 49, the subject matter of Example 48 can optionally include wherein to receive the first data transmission, the transceiver is configured to receive the first data transmission multiplexed with a third data transmission.

In Example 50, the subject matter of one or any combination of Examples 48-49 can optionally include wherein the first data transmission and the third data transmission are multiplexed in a time-division.

In Example 51, the subject matter of one or any combination of Examples 48-50 can optionally include wherein the first data transmission and the third data transmission are multiplexed in a frequency-division.

In Example 52, the subject matter of one or any combination of Examples 48-51 can optionally include wherein to transmit the second data transmission, the transceiver is configured to transmit the second data transmission multiplexed with a fourth data transmission.

In Example 53, the subject matter of one or any combination of Examples 48-52 can optionally include wherein to receive the first data transmission, the transceiver is configured to receive the first data transmission using intra-slot hopping.

In Example 54, the subject matter of one or any combination of Examples 48-53 can optionally include wherein to transmit the second data transmission, the transceiver is configured to transmit the second data transmission multiplexed in a frequency-division with transmissions on a physical uplink control channel (PUCCH) or a physical random access channel (PRACH).

In Example 55, the subject matter of one or any combination of Examples 48-54 can optionally include wherein to transmit the second data transmission, the transceiver is further configured to transmit the second data transmission in an intra-slot hopping frequency transmission.

In Example 56, the subject matter of one or any combination of Examples 48-55 can optionally include wherein the intra-slot hopping frequency transmission includes a fixed hopping pattern.

In Example 57, the subject matter of one or any combination of Examples 48-56 can optionally include wherein the fixed hopping pattern includes information about a physical cell identity.

In Example 58, the subject matter of one or any combination of Examples 48-57 can optionally include wherein the fixed hopping pattern includes information about a subframe index.

In Example 59, the subject matter of one or any combination of Examples 48-58 can optionally include wherein the MTC region is predefined.

In Example 60, the subject matter of one or any combination of Examples 48-59 can optionally include wherein the SIB includes time and frequency resource information of the MTC region for the UE.

In Example 61, the subject matter of one or any combination of Examples 48-60 can optionally include wherein the transceiver is further configured to receive, from the eNB, separate signaling configurations for an uplink MTC region and a downlink MTC region.

In Example 62, the subject matter of one or any combination of Examples 48-61 can optionally include wherein the transceiver is further configured to receive, from the eNB, a joint signaling configuration for an uplink MTC region and a downlink MTC region.

In Example 63, the subject matter of one or any combination of Examples 48-62 can optionally include wherein the transceiver is further configured to receive, from the eNB, primary and secondary synchronization signals (PSS/SSS).

In Example 64, the subject matter of one or any combination of Examples 48-63 can optionally include wherein the transceiver is further configured to rate-match resource element mapping around the PSS/SSS within the MTC region.

In Example 65, the subject matter of one or any combination of Examples 48-64 can optionally include wherein the transceiver is further configured to receive, from the eNB, a channel state information reference signal (CSI-RS).

In Example 66, the subject matter of one or any combination of Examples 48-65 can optionally include wherein the transceiver is further configured to rate-match resource element mapping around the CSI-RS within the MTC region.

In Example 67, the subject matter of one or any combination of Examples 48-66 can optionally include wherein the transceiver is further configured to avoid collisions between the CSI-RS and transmissions in the MTC region.

In Example 68, the subject matter of one or any combination of Examples 48-67 can optionally include wherein the transceiver is further configured to receive, from the eNB, a cell-specific reference signal.

In Example 69, the subject matter of one or any combination of Examples 48-68 can optionally include wherein the cell-specific reference signal is received in a multimedia broadcast single frequency network subframe in the MTC region.

In Example 70, the subject matter of one or any combination of Examples 48-69 can optionally include wherein the cell-specific reference signal includes a resource mapping pattern using a MTC random seed.

In Example 71, the subject matter of one or any combination of Examples 48-70 can optionally include wherein the transceiver is further configured to receive, from the eNB, a MTC master information block (M-MIB).

In Example 72, the subject matter of one or any combination of Examples 48-71 can optionally include wherein to receive the M-MIB, the transceiver is further configured to receive the M-MIB in a subframe in a frame within the MTC region.

In Example 73, the subject matter of one or any combination of Examples 48-72 can optionally include wherein the M-MIB includes time and frequency resource information for the UE.

In Example 74, the subject matter of one or any combination of Examples 48-73 can optionally include wherein to receive the M-MIB, the transceiver is further configured to receive the M-MIB on a MTC physical broadcast channel (M-PBCH).

In Example 75, the subject matter of one or any combination of Examples 48-74 can optionally include wherein the transceiver is further configured to receive a MTC physical broadcast channel (M-PBCH) transmission in a subframe.

In Example 76, the subject matter of one or any combination of Examples 48-75 can optionally include wherein the subframe includes a subframe not used for primary and secondary synchronization signals (PSS/SSS).

In Example 77, the subject matter of one or any combination of Examples 48-76 can optionally include wherein the transceiver is further configured to receive, from the UE, a second subframe, the second subframe including a physical broadcast channel (PBCH) transmission different from the M-PBCH transmission.

In Example 78, the subject matter of one or any combination of Examples 48-77 can optionally include wherein the PBCH transmission and the M-PBCH transmission are time-division multiplexed between the subframe and the second subframe, and wherein the PBCH transmission and the M-PBCH transmission are allocated in the same resource.

In Example 79, the subject matter of one or any combination of Examples 48-78 can optionally include wherein the transceiver is further configured to receive a physical broadcast channel (PBCH) transmission different from the M-PBCH transmission in the subframe.

In Example 80, the subject matter of one or any combination of Examples 48-79 can optionally include wherein the PBCH transmission and the M-PBCH transmission are time-division multiplexed within the subframe.

In Example 81, the subject matter of one or any combination of Examples 48-80 can optionally include wherein the transceiver is further configured to receive, from the eNB, a MTC physical control format indicator channel (PCFICH) transmission.

In Example 82, the subject matter of one or any combination of Examples 48-81 can optionally include wherein to receive the MTC PCFICH transmission, the transceiver is further configured to determine that a number of orthogonal frequency-division multiplexing (OFDM) symbols allocated for MTC physical downlink control channel (M-PDCCH) and a starting symbol for a MTC physical downlink shared channel (M-PDSCH) transmission are not pre-defined.

In Example 83, the subject matter of one or any combination of Examples 48-82 can optionally include wherein the transceiver is further configured to receive, from the eNB, a physical hybrid-automatic repeat request (ARQ) indicator channel M-PHICH transmission.

In Example 84, the subject matter of one or any combination of Examples 48-83 can optionally include wherein to receive the M-PHICH, the transceiver is further configured to receive, from the eNB, configuration information in a system information block (SIB) or a master information block (MIB).

In Example 85, the subject matter of one or any combination of Examples 48-84 can optionally include wherein to receive the M-PHICH, the transceiver is further configured to determine that a MTC physical downlink control channel (M-PDCCH) has not replaced the M-PHICH functionality.

In Example 86, the subject matter of one or any combination of Examples 48-85 can optionally include wherein the transceiver is further configured to receive, from the eNB, a MTC physical downlink control channel (M-PDCCH) transmission in the MTC region.

In Example 87, the subject matter of one or any combination of Examples 48-86 can optionally include wherein the M-PDCCH includes an existing enhanced physical downlink control channel (EPDCCH).

In Example 88, the subject matter of one or any combination of Examples 48-87 can optionally include wherein the transceiver is further configured to transmit a MTC physical random access channel (M-PRACH) transmission.

In Example 89, the subject matter of one or any combination of Examples 48-88 can optionally include wherein the M-PRACH transmission is time-division multiplexed with a MTC physical uplink control channel (M-PUCCH) transmission and a MTC physical uplink shared channel (M-PUSCH) transmission in the MTC region.

In Example 90, the subject matter of one or any combination of Examples 48-89 can optionally include wherein the M-PUCCH transmission and the M-PUSCH transmission are frequency-division multiplexed in the MTC region.

Example 91 includes the subject matter embodied by a User Equipment (UE) configured to operate on a machine-type communication (MTC) MTC region of a wireless spectrum comprising: a transceiver configured to: receive, from an evolved Node B (eNB) a physical downlink control channel (PDCCH) transmission on a licensed band, receive, from the eNB, a MTC master information block (M-MIB), the M-MIB including configuration information to configure the MTC region, and receive a first data transmission on the MTC region in a downlink, wherein the MTC region includes a subset of frequencies of the licensed band, and transmit a second data transmission on the MTC region in an uplink.

In Example 92, the subject matter of Example 91 can optionally include wherein the transceiver is further configured to receive, from the eNB, a MTC system information block (M-SIB).

In Example 93, the subject matter of one or any combination of Examples 91-92 can optionally include wherein to receive the M-SIB, the transceiver is further configured to receive the M-SIB in a subframe in a frame within the MTC region.

In Example 94, the subject matter of one or any combination of Examples 91-93 can optionally include wherein the M-SIB includes time and frequency resource information for the UE.

Example 95 includes the subject matter embodied by a method for configuring a User Equipment (UE) for communication performed by circuitry of an evolved Node B (eNB), the method comprising: broadcasting, from the eNB, a physical downlink control channel (PDCCH) transmission on a licensed band, transmitting, from the eNB to the UE, a physical broadcast channel (PBCH) transmission multiplexed with a machine-type communication (MTC) PBCH (M-PBCH) transmission, the M-PBCH transmission including a MTC system information block (M-SIB), the M-SIB including configuration information to configure a MTC region of the licensed band, wherein the MTC region includes a subset of frequencies of the licensed band, and transmitting, from the eNB to the UE, a first data transmission on the MTC region in a downlink.

In Example 96, the subject matter of Example 95 can optionally include further comprising receiving, from the UE, a second data transmission on the MTC region in an uplink.

In Example 97, the subject matter of one or any combination of Examples 95-96 can optionally include wherein receiving the second data transmission includes receiving the second data transmission multiplexed in a frequency-division with transmissions on a physical uplink control channel (PUCCH) or a physical random access channel (PRACH).

In Example 98, the subject matter of one or any combination of Examples 95-97 can optionally include wherein receiving the second data transmission includes receiving the second data transmission in an intra-slot hopping frequency transmission.

In Example 99, the subject matter of one or any combination of Examples 95-98 can optionally include further comprising multiplexing the first data transmission and a third data transmission in a time-division.

In Example 100, the subject matter of one or any combination of Examples 95-99 can optionally include further comprising multiplexing the first data transmission and a third transmission in a frequency-division.

In Example 101, the subject matter of one or any combination of Examples 95-100 can optionally include wherein transmitting the first data transmission includes transmitting the first data transmission using intra-slot hopping.

In Example 102, the subject matter of one or any combination of Examples 95-101 can optionally include wherein the intra-slot hopping frequency transmission includes a fixed hopping pattern.

In Example 103, the subject matter of one or any combination of Examples 95-102 can optionally include wherein the fixed hopping pattern includes information about a physical cell identity.

In Example 104, the subject matter of one or any combination of Examples 95-103 can optionally include wherein the fixed hopping pattern includes information about a subframe index.

In Example 105, the subject matter of one or any combination of Examples 95-104 can optionally include wherein the MTC region is predefined.

In Example 106, the subject matter of one or any combination of Examples 95-105 can optionally include wherein the SIB includes time and frequency resource information for the UE.

In Example 107, the subject matter of one or any combination of Examples 95-106 can optionally include further comprising transmitting, to the UE, separate signaling configurations for an uplink MTC region and a downlink MTC region.

In Example 108, the subject matter of one or any combination of Examples 95-107 can optionally include further comprising transmitting, to the UE, a joint signaling configuration for an uplink MTC region and a downlink MTC region.

In Example 109, the subject matter of one or any combination of Examples 95-108 can optionally include further comprising transmitting, to the UE, primary and secondary synchronization signals (PSS/SSS).

In Example 110, the subject matter of one or any combination of Examples 95-109 can optionally include further comprising rate-matching resource element mapping around the PSS/SSS within the MTC region.

In Example 111, the subject matter of one or any combination of Examples 95-110 can optionally include further comprising transmitting, to the UE, a channel state information reference signal (CSI-RS).

In Example 112, the subject matter of one or any combination of Examples 95-111 can optionally include further comprising rate-matching resource element mapping around the CSI-RS within the MTC region.

In Example 113, the subject matter of one or any combination of Examples 95-112 can optionally include further comprising avoiding collisions between the CSI-RS and transmissions in the MTC region.

In Example 114, the subject matter of one or any combination of Examples 95-113 can optionally include further comprising, transmitting, to the UE, a cell-specific reference signal.

In Example 115, the subject matter of one or any combination of Examples 95-114 can optionally include wherein the cell-specific reference signal is transmitted in a multimedia broadcast single frequency network subframe in the MTC region.

In Example 116, the subject matter of one or any combination of Examples 95-115 can optionally include wherein the cell-specific reference signal includes a resource mapping pattern using a MTC random seed.

In Example 117, the subject matter of one or any combination of Examples 95-116 can optionally include further comprising transmitting, to the UE, a MTC master information block (M-MIB).

In Example 118, the subject matter of one or any combination of Examples 95-117 can optionally include wherein transmitting the M-MIB includes transmitting the M-MIB in a subframe in a frame within the MTC region.

In Example 119, the subject matter of one or any combination of Examples 95-118 can optionally include wherein the M-MIB includes time and frequency resource information for the UE.

In Example 120, the subject matter of one or any combination of Examples 95-119 can optionally include wherein transmitting the M-MIB includes transmitting the M-MIB on a MTC physical broadcast channel (M-PBCH).

In Example 121, the subject matter of one or any combination of Examples 95-120 can optionally include wherein transmitting the M-PBCH includes transmitting the M-PBCH in a subframe.

In Example 122, the subject matter of one or any combination of Examples 95-121 can optionally include wherein the subframe includes a subframe not used for primary and secondary synchronization signals (PSS/SSS).

In Example 123, the subject matter of one or any combination of Examples 95-122 can optionally include further comprising transmitting to the UE, a second subframe, the second subframe including a physical broadcast channel (PBCH) transmission different from the M-PBCH.

In Example 124, the subject matter of one or any combination of Examples 95-123 can optionally include wherein the PBCH transmission and the M-PBCH transmission are time-division multiplexed between the subframe and the second subframe, and wherein the PBCH transmission and the M-PBCH transmission are allocated in the same resource.

In Example 125, the subject matter of one or any combination of Examples 95-124 can optionally include further comprising transmitting a physical broadcast channel (PBCH) transmission different from the M-PBCH in the subframe.

In Example 126, the subject matter of one or any combination of Examples 95-125 can optionally include wherein the PBCH transmission and the M-PBCH transmission are time-division multiplexed within the subframe.

In Example 127, the subject matter of one or any combination of Examples 95-126 can optionally include further comprising transmitting, to the UE, a MTC physical control format indicator channel (PCFICH) transmission.

In Example 128, the subject matter of one or any combination of Examples 95-127 can optionally include wherein transmitting the MTC PCFICH transmission includes determining that a number of orthogonal frequency-division multiplexing (OFDM) symbols allocated for MTC physical downlink control channel (M-PDCCH) and a starting symbol for a MTC physical downlink shared channel (M-PDSCH) transmission are not pre-defined.

In Example 129, the subject matter of one or any combination of Examples 95-128 can optionally include further comprising transmitting, to the UE, a physical hybrid-automatic repeat request (ARQ) indicator channel M-PHICH transmission.

In Example 130, the subject matter of one or any combination of Examples 95-129 can optionally include wherein transmitting the M-PHICH includes transmitting, to the UE, configuration information in a system information block (SIB) or a master information block (MIB).

In Example 131, the subject matter of one or any combination of Examples 95-130 can optionally include wherein transmitting the M-PHICH includes determining that a MTC physical downlink control channel (M-PDCCH) has not replaced the M-PHICH functionality.

In Example 132, the subject matter of one or any combination of Examples 95-131 can optionally include further comprising transmitting, to the UE, a MTC physical downlink control channel (M-PDCCH) transmission in the MTC region.

In Example 133, the subject matter of one or any combination of Examples 95-132 can optionally include wherein the M-PDCCH includes an existing enhanced physical downlink control channel (EPDCCH).

In Example 134, the subject matter of one or any combination of Examples 95-133 can optionally include further comprising receiving a MTC physical random access channel (M-PRACH) transmission from the UE.

In Example 135, the subject matter of one or any combination of Examples 95-134 can optionally include wherein the M-PRACH transmission is time-division multiplexed with a MTC physical uplink control channel (M-PUCCH) transmission and a MTC physical uplink shared channel (M-PUSCH) transmission in the MTC region.

In Example 136, the subject matter of one or any combination of Examples 95-135 can optionally include wherein the M-PUCCH transmission and the M-PUSCH transmission are frequency-division multiplexed in the MTC region.

Example 137 includes an apparatus comprising means for performing any of the methods of examples 95-136.

Example 138 includes at least one machine-readable medium including instructions for operation of a computer system, which when executed by a machine, cause the machine to perform any of the methods of examples 95-136.

Example 139 includes the subject matter embodied by an apparatus for configuring a User Equipment (UE) for communication comprising: means for broadcasting, from an evolved Node B (eNB), a physical downlink control channel (PDCCH) transmission on a licensed band, means for transmitting, from the eNB to the UE, a physical broadcast channel (PBCH) transmission multiplexed with a machine-type communication (MTC) PBCH (M-PBCH) transmission, the M-PBCH transmission including a MTC system information block (M-SIB), the M-SIB including configuration information to configure a MTC region of the licensed band, wherein the MTC region includes a subset of frequencies of the licensed band, and means for transmitting, from the eNB to the UE, a first data transmission on the MTC region in a downlink.

Example 140 includes the subject matter embodied by at least one machine-readable medium including instructions for operation of a computing system, which when executed by a machine, cause the machine to: broadcast, from an evolved Node B (eNB), a physical downlink control channel (PDCCH) transmission on a licensed band, transmit, from the eNB to the UE, a physical broadcast channel (PBCH) transmission multiplexed with a machine-type communication (MTC) PBCH (M-PBCH) transmission, the M-PBCH transmission including a MTC system information block (M-SIB), the M-SIB including configuration information to configure a MTC region of the licensed band, wherein the MTC region includes a subset of frequencies of the licensed band, and transmit, from the eNB to the UE, a first data transmission on the MTC region in a downlink.

Example 141 includes the subject matter embodied by a method for configuring a User Equipment (UE) to operate on a MTC region of a wireless spectrum, the method comprising: receiving, at the UE from an evolved Node B (eNB), a physical downlink control channel (PDCCH) transmission on a licensed band, receiving, at the UE from the eNB, a machine-type communication (MTC) physical broadcast channel (M-PBCH) transmission including a MTC system information block (M-SIB) on the MTC region, and transmitting, from the UE, a data transmission on the MTC region in an uplink, wherein the MTC region includes a subset of frequencies of the licensed band.

In Example 142, the subject matter of Example 140 can optionally include wherein transmitting the data transmission includes transmitting the data transmission multiplexed with a second data transmission.

In Example 143, the subject matter of one or any combination of Examples 141-142 can optionally include wherein the data transmission and the second data transmission are multiplexed in a time-division.

In Example 144, the subject matter of one or any combination of Examples 141-143 can optionally include wherein the data transmission and the second data transmission are multiplexed in a frequency-division.

In Example 145, the subject matter of one or any combination of Examples 141-144 can optionally include wherein transmitting the data transmission includes transmitting the data transmission using intra-slot hopping.

In Example 146, the subject matter of one or any combination of Examples 141-145 can optionally include further comprising receiving, from the eNB, a third data transmission on the MTC region in a downlink.

In Example 147, the subject matter of one or any combination of Examples 141-146 can optionally include wherein receiving the third data transmission includes receiving the third data transmission in an intra-slot hopping frequency transmission.

In Example 148, the subject matter of one or any combination of Examples 141-147 can optionally include wherein the intra-slot hopping frequency transmission includes a fixed hopping pattern.

In Example 149, the subject matter of one or any combination of Examples 141-148 can optionally include wherein the fixed hopping pattern includes information about a physical cell identity.

In Example 150, the subject matter of one or any combination of Examples 141-149 can optionally include wherein the fixed hopping pattern includes information about a subframe index.

In Example 151, the subject matter of one or any combination of Examples 141-150 can optionally include wherein the MTC region is predefined.

In Example 152, the subject matter of one or any combination of Examples 141-151 can optionally include wherein the SIB includes time and frequency resource information for the UE.

In Example 153, the subject matter of one or any combination of Examples 141-152 can optionally include further comprising receiving, from the eNB, separate signaling configurations for an uplink MTC region and a downlink MTC region.

In Example 154, the subject matter of one or any combination of Examples 141-153 can optionally include further comprising receiving, from the eNB, a joint signaling configuration for an uplink MTC region and a downlink MTC region.

In Example 155, the subject matter of one or any combination of Examples 141-154 can optionally include further comprising receiving, from the eNB, primary and secondary synchronization signals (PSS/SSS).

In Example 156, the subject matter of one or any combination of Examples 141-155 can optionally include further comprising rate-matching resource element mapping around the PSS/SSS within the MTC region.

In Example 157, the subject matter of one or any combination of Examples 141-156 can optionally include further comprising receiving, from the eNB, a channel state information reference signal (CSI-RS).

In Example 158, the subject matter of one or any combination of Examples 141-157 can optionally include further comprising rate-matching resource element mapping around the CSI-RS within the MTC region.

In Example 159, the subject matter of one or any combination of Examples 141-158 can optionally include further comprising avoiding collisions between the CSI-RS and transmissions in the MTC region.

In Example 160, the subject matter of one or any combination of Examples 141-159 can optionally include further comprising receiving, from the eNB, a cell-specific reference signal.

In Example 161, the subject matter of one or any combination of Examples 141-160 can optionally include wherein the cell-specific reference signal is received in a multimedia broadcast single frequency network subframe in the MTC region.

In Example 162, the subject matter of one or any combination of Examples 141-161 can optionally include wherein the cell-specific reference signal includes a resource mapping pattern using a MTC random seed.

In Example 163, the subject matter of one or any combination of Examples 141-162 can optionally include further comprising receiving, from the eNB, a MTC master information block (M-MIB).

In Example 164, the subject matter of one or any combination of Examples 141-163 can optionally include wherein receiving the M-MIB includes receiving the M-MIB in a subframe in a frame within the MTC region.

In Example 165, the subject matter of one or any combination of Examples 141-164 can optionally include wherein the M-MIB includes time and frequency resource information for the UE.

In Example 166, the subject matter of one or any combination of Examples 141-165 can optionally include wherein receiving the M-MIB includes receiving the M-MIB on a MTC physical broadcast channel (M-PBCH).

In Example 167, the subject matter of one or any combination of Examples 141-166 can optionally include wherein receiving the M-PBCH includes receiving the M-PBCH in a subframe.

In Example 168, the subject matter of one or any combination of Examples 141-167 can optionally include wherein the subframe includes a subframe not used for primary and secondary synchronization signals (PSS/SSS).

In Example 169, the subject matter of one or any combination of Examples 141-168 can optionally include further comprising receiving, from the UE, a second subframe, the second subframe including a physical broadcast channel (PBCH) transmission different from the M-PBCH.

In Example 170, the subject matter of one or any combination of Examples 141-169 can optionally include wherein the PBCH transmission and the M-PBCH transmission are time-division multiplexed between the subframe and the second subframe, and wherein the PBCH transmission and the M-PBCH transmission are allocated in the same resource.

In Example 171, the subject matter of one or any combination of Examples 141-170 can optionally include further comprising receiving a physical broadcast channel (PBCH) transmission different from the M-PBCH in the subframe.

In Example 172, the subject matter of one or any combination of Examples 141-171 can optionally include wherein the PBCH transmission and the M-PBCH transmission are time-division multiplexed within the subframe.

In Example 173, the subject matter of one or any combination of Examples 141-172 can optionally include further comprising receiving, from the eNB, a MTC physical control format indicator channel (PCFICH) transmission.

In Example 174, the subject matter of one or any combination of Examples 141-173 can optionally include wherein receiving the MTC PCFICH transmission includes determining that a number of orthogonal frequency-division multiplexing (OFDM) symbols allocated for MTC physical downlink control channel (M-PDCCH) and a starting symbol for a MTC physical downlink shared channel (M-PDSCH) transmission are not pre-defined.

In Example 175, the subject matter of one or any combination of Examples 141-174 can optionally include further comprising receiving, from the eNB, a physical hybrid-automatic repeat request (ARQ) indicator channel M-PHICH transmission.

In Example 176, the subject matter of one or any combination of Examples 141-175 can optionally include wherein receiving the M-PHICH includes receiving, from the eNB, configuration information in a system information block (SIB) or a master information block (MIB).

In Example 177, the subject matter of one or any combination of Examples 141-176 can optionally include wherein receiving the M-PHICH includes determining that a MTC physical downlink control channel (M-PDCCH) has not replaced the M-PHICH functionality.

In Example 178, the subject matter of one or any combination of Examples 141-177 can optionally include further comprising receiving, from the eNB, a MTC physical downlink control channel (M-PDCCH) transmission in the MTC region.

In Example 179, the subject matter of one or any combination of Examples 141-178 can optionally include wherein the M-PDCCH includes an existing enhanced physical downlink control channel (EPDCCH).

In Example 180, the subject matter of one or any combination of Examples 141-179 can optionally include further comprising transmitting a MTC physical random access channel (M-PRACH) transmission.

In Example 181, the subject matter of one or any combination of Examples 141-180 can optionally include wherein the M-PRACH transmission is time-division multiplexed with a MTC physical uplink control channel (M-PUCCH) transmission and a MTC physical uplink shared channel (M-PUSCH) transmission in the MTC region.

In Example 182, the subject matter of one or any combination of Examples 141-181 can optionally include wherein the M-PUCCH transmission and the M-PUSCH transmission are frequency-division multiplexed in the MTC region.

Example 183 includes an apparatus comprising means for performing any of the methods of examples 141-182.

Example 184 includes at least one machine-readable medium including instructions for operation of a computer system, which when executed by a machine, cause the machine to perform any of the methods of examples 141-182.

Example 185 the subject matter embodied by at least one machine-readable medium including instructions for operation of a computing system, which when executed by a machine, cause the machine to: receive, at a User Equipment (UE) from an evolved Node B (eNB), a physical downlink control channel (PDCCH) transmission on a licensed band, receive, at the UE from the eNB, a machine-type communication (MTC) physical broadcast channel (M-PBCH) transmission including a MTC system information block (M-SIB), the SIB including configuration information to configure a MTC region of the licensed band, wherein the MTC region includes a subset of frequencies of the licensed band, and transmit, from the UE, a data transmission on the MTC region in an uplink.

In Example 186, the subject matter of Example 185 can optionally include wherein operations to receive the data transmission include operations to receive the data transmission using intra-slot hopping.

The above detailed description includes references to the accompanying drawings, which form a part of the detailed description. The drawings show, by way of illustration, specific embodiments. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations.

What is claimed is:

1. An evolved Node B (eNB) configured to communicate with a User Equipment (UE) on a licensed band, the eNB comprising circuitry configured to:
    transmit a physical downlink control channel (PDCCH) transmission on the licensed band;
    transmit, to the UE, a machine-type communication (MTC) system information block (M-SIB), the M-SIB including configuration information to configure a MTC region of the licensed band, wherein the MTC region includes a subset of frequencies of the licensed band, wherein the MTC region has a bandwidth of 1.4 MHz or less;
    transmit, to the UE, resource allocation information in a MTC downlink control channel of the MTC region, the MTC downlink control channel being time multiplexed with the PDCCH;
    transmit, to the UE, a channel state information reference signal (CSI-RS) within the MTC region;
    rate-match the resource allocation information around resource elements for the CSI-RS to avoid collisions between the CSI-RS and transmissions in the MTC region;
    transmit, to the UE, first data transmission on the MTC region in a downlink; and
    receive, from the UE, a second data transmission on the MTC region in an uplink.

2. The eNB of claim 1, wherein to transmit the first data transmission, the circuitry is configured to transmit the first data transmission multiplexed with a third data transmission.

3. The eNB of claim 2, wherein the first data transmission and the third data transmission are multiplexed in a time-division.

4. The eNB of claim 1, wherein to receive the second data transmission, the circuitry is configured to receive the second data transmission multiplexed in a frequency-division with transmissions on a physical uplink control channel (PUCCH) or a physical random access channel (PRACH).

5. The eNB of claim 1, wherein the M-SIB includes time and frequency resource information of the MTC region for the UE.

6. The eNB of claim 1, wherein the circuitry is further configured to transmit, to the UE, primary and secondary synchronization signals (PSS/SSS).

7. The eNB of claim 6, wherein the circuitry is further configured to rate-match resource element mapping around the PSS/SSS within the MTC region.

8. The eNB of claim 1, wherein the circuitry is further configured to transmit, to the UE, a cell-specific reference signal.

9. The eNB of claim 1, wherein the circuitry is further configured to transmit, to the UE, a MTC master information block (M-MIB).

10. The eNB of claim 9, wherein to transmit the M-MIB, the circuitry is further configured to transmit the M-MIB in a subframe in a frame within the MTC region.

11. The eNB of claim 1, wherein the circuitry is further configured to transmit a MTC physical broadcast channel (M-PBCH) transmission in a subframe.

12. The eNB of claim 11, wherein the circuitry is further configured to transmit, to the UE, a second subframe, the second subframe including a physical broadcast channel (PBCH) transmission different from the M-PBCH transmission.

13. The eNB of claim 12, wherein the PBCH transmission and the M-PBCH transmission are time-division multiplexed between the subframe and the second subframe, and wherein the PBCH transmission and the M-PBCH transmission are allocated in the same resource.

14. The eNB of claim 11, wherein the circuitry is further configured to transmit a physical broadcast channel (PBCH) transmission different from the M-PBCH transmission in the subframe.

15. A User Equipment (UE) configured to operate on a machine-type communication (MTC) MTC region of a wireless spectrum comprising:
a transceiver configured to:
receive, from an evolved Node B (eNB) a physical downlink control channel (PDCCH) transmission on a licensed band;
receive, from the eNB, a MTC system information block (M-SIB), the M-SIB including configuration information to configure the MTC region, wherein the MTC region has a bandwidth of 1.4 MHz or less;
receive, from the eNB, resource allocation information in a MTC down ink control channel of the MTC region, the MTC downlink control channel being time multiplexed with the PDCCH;
receive, from the eNB, a channel state information reference signal (CSI-RS) within the MTC region, wherein the resource allocation information is rate-matched around resource elements for the CSI-RS to avoid collisions between the CSI-RS and transmissions in the MTC region;
receive a first data transmission on the MTC region in a downlink, wherein the MTC region includes a subset of frequencies of the licensed band; and
transmit a second data transmission on the MTC region in an uplink.

16. The UE of claim 15, wherein the transceiver is further configured to transmit a MTC physical random access channel (M-PRACH) transmission.

17. The UE of claim 16, wherein the M-PRACH transmission is time-division multiplexed with a MTC physical uplink control channel (M-PUCCH) transmission and a MTC physical uplink shared channel (M-PUSCH) transmission in the MTC region.

18. The UE of claim 15, further comprising one or more antennas coupled to the transceiver.

19. A method for configuring a User Equipment (UE) for communication performed by circuitry of an evolved Node B (eNB), the method comprising:
broadcasting, from the eNB, a physical downlink control channel (PDCCH) transmission on a licensed band;
transmitting, from the eNB to the UE, a physical broadcast channel (PBCH) transmission multiplexed with a machine-type communication (MTC) PBCH (M-PBCH) transmission, the M-PBCH transmission including a MTC system information block (M-SIB), the M-SIB including configuration information to configure a MTC region of the licensed band, wherein the MTC region includes a subset of frequencies of the licensed band, and wherein the MTC region has a bandwidth of 1.4 MHz or less;
transmitting, from the eNB to the UE, resource allocation information in a MTC downlink control channel of the MTC region, the MTC downlink control channel being time multiplexed with the PDCCH;
transmitting, to the UE, a channel state information reference signal (CSI-RS) within the MTC region;
rate-matching the resource allocation information around resource elements for the CSI-RS to avoid collisions between the CSI-RS and transmissions in the MTC region; and
transmitting, from the eNB to the UE, a first data transmission on the MTC region a downlink.

20. The method of claim 19, farther comprising transmitting, to the UE, a physical hybrid-automatic repeat request (ARQ) indicator channel M-PHICH transmission.

21. The method of claim 20, wherein ing the M-PHICH includes transmitting, to the UE, configuration information in a system information block (SIB) or a master information block (MIB).

22. At least one non-transitory machine-readable medium including instructions for operation of a computing system, which when executed by a machine, cause the machine to:
receive, at a User Equipment (UE) from an evolved Node B (eNB), a physical downlink control channel (PDCCH) transmission on a licensed band;
receive, at the UE from the eNB, a machine-type communication (MTC) physical broadcast channel (M-PBCH) transmission including a MTC system information block (M-SIB), the SIB including configuration information to configure a MTC region of the licensed band, wherein the MTC region includes a subset of frequencies of the licensed band, and wherein the MTC region has a bandwidth of 1.4 MHz or less;
receive, at the UE from the eNB, resource allocation information in a MTC downlink control channel of the MTC region, the MTC downlink control channel being time multiplexed with the PDCCH;
receive, from the eNB, a channel state information reference signal (CSI-RS) within the MTC region, wherein the resource allocation information is rate-matched around resource elements for the CSI-RS to avoid collisions between the CSI-RS and transmissions in the MTC region; and
transmit, from the UE, a data transmission on the MTC region in an uplink.

23. The machine-readable medium of claim 22, wherein operation s to receive the data transmission include operations to receive the data transmission using intra-slot hopping.

* * * * *

UNITED STATES PATENT AND TRADEMARK OFFICE
CERTIFICATE OF CORRECTION

PATENT NO. : 9,820,247 B2  
APPLICATION NO. : 14/667430  
DATED : November 14, 2017  
INVENTOR(S) : Xiong et al.

It is certified that error appears in the above-identified patent and that said Letters Patent is hereby corrected as shown below:

On the Title Page

In Column 2, under "Other Publications", Line 1, delete "Serach" and insert --Search-- therefor In the Claims In Column 33, Line 49, in Claim 15, delete "down ink" and insert --downlink-- therefor In Column 34, Line 34, in Claim 19, after "region", insert --in--

In Column 34, Line 35, in Claim 20, delete "farther" and insert --further-- therefor In Column 34, Line 38, in Claim 21, delete "ing" and insert --transmitting-- therefor In Column 35, Line 2, in Claim 23, delete "operation s" and insert --operations-- therefor Signed and Sealed this  
Eighteenth Day of June, 2019

Andrei Iancu  
*Director of the United States Patent and Trademark Office*